United States Patent
Nishino et al.

(10) Patent No.: US 9,939,767 B2
(45) Date of Patent: Apr. 10, 2018

(54) IMAGE FORMING APPARATUS AND CONTROL METHOD FOR IMAGE FORMING APPARATUS

(71) Applicant: KYOCERA Document Solutions Inc., Osaka (JP)

(72) Inventors: Tetsuya Nishino, Osaka (JP); Naoaki Fukuoka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/515,906

(22) PCT Filed: Sep. 29, 2015

(86) PCT No.: PCT/JP2015/077559
§ 371 (c)(1),
(2) Date: Mar. 30, 2017

(87) PCT Pub. No.: WO2016/052526
PCT Pub. Date: Apr. 7, 2016

(65) Prior Publication Data
US 2017/0308019 A1    Oct. 26, 2017

(30) Foreign Application Priority Data
Oct. 2, 2014    (JP) .................................. 2014-204082

(51) Int. Cl.
*G03G 15/00*    (2006.01)
*B65H 7/02*    (2006.01)
(Continued)

(52) U.S. Cl.
CPC ........... *G03G 15/5062* (2013.01); *B65H 1/00* (2013.01); *B65H 7/02* (2013.01); *H04N 1/00411* (2013.01); *H04N 1/00602* (2013.01); *H04N 1/00708* (2013.01); *H04N 1/00798* (2013.01); *H04N 2201/0094* (2013.01)

(58) Field of Classification Search
CPC ........ G03G 15/5062; B65H 1/00; B65H 7/02; H04N 1/00411; H04N 1/00602; H04N 1/00708; H04N 1/00798; H04N 2201/0094
See application file for complete search history.

(56) References Cited

U.S. PATENT DOCUMENTS 5,689,759 A * 11/1997 Isemura ............. G03G 15/6514
271/171
9,426,310 B2 * 8/2016 Onuki ................ H04N 1/00737
(Continued)

FOREIGN PATENT DOCUMENTS

JP    H 08-016045 A    1/1996

*Primary Examiner* — Francis Gray
(74) *Attorney, Agent, or Firm* — Stein IP, LLC

(57) ABSTRACT

This image forming apparatus (100) is equipped with: a document set detector (3a, S1, S5); a document size detector (3a, S2, S3, S5); a manual feeder (6) with a manual feed tray (61) that is not equipped with a sensor for detecting the size of set manually-fed paper; a printer (5) that performs printing on the basis of image data; an operation panel (4) that receives setting for feeding paper from the manual feeder (6); and a controller (7) that recognizes the size of a set document and performs manually-fed-paper automatic setting for recognizing the recognized size of the set document as the size of the manually-fed paper.

13 Claims, 11 Drawing Sheets

(51) Int. Cl.
 *B65H 1/00* (2006.01)
 *H04N 1/00* (2006.01)

(56) References Cited

U.S. PATENT DOCUMENTS

| | | | | |
|---|---|---|---|---|
| 2009/0166949 A1* | 7/2009 | Unno | ............ | B41J 11/485 |
| | | | | 271/9.03 |
| 2014/0055815 A1* | 2/2014 | Gabe | ............ | H04N 1/00668 |
| | | | | 358/1.15 |

* cited by examiner

| DETECTED DOCUMENT SIZE | SET MAGNIFICATION (%) | RECOMMENDED SIZE |
|---|---|---|
| A4 | 123～141 | A3 |
| | 101～122 | B4 |
| | 100 | A4 |
| | 86～99 | A4 |
| | 70～85 | B5 |
| | 69以下 | A5 |
| Letter | ... | ... |
| ... | ... | ... |

IMAGE FORMING APPARATUS AND CONTROL METHOD FOR IMAGE FORMING APPARATUS

CROSS-REFERENCE TO RELATED APPLICATIONS

This application is a national stage of International Application No. PCT/JP2015/077559, filed Sep. 29, 2015, which claims the benefit of priority to Japanese Application No. 2014-204082, filed Oct. 2, 2014, in the Japanese Patent Office, the disclosures of which are incorporated herein in their entireties by reference.

TECHNICAL FIELD

The present invention relates to an image forming apparatus including a manual paper feed portion.

BACKGROUND ART

An image forming apparatus such as a multi-functional peripheral, a copy machine, or a printer is provided with a paper sheet cassette that houses paper sheets to be used for printing and performs paper feeding. Generally, paper sheet sizes placeable in the paper sheet cassette are regular sizes such as an A-type size and a letter size. Furthermore, in addition to the paper sheet cassette, a manual feed tray may be provided in the image forming apparatus. A paper sheet on the manual feed tray is replaced with another paper sheet, which then is brought to a state of being able to be fed. The manual feed tray, therefore, is advantageous in that changing to a paper sheet of a different size is easier compared with the paper sheet cassette. Furthermore, in a case where printing is performed by using a paper sheet of a size (a custom size) other than the regular sizes, the paper sheet is placed on the manual feed tray.

Patent Document 1 describes one example of such an image forming apparatus provided with a manual paper feed function. Specifically, Patent Document 1 describes an image forming apparatus that has the manual paper feed function, stores an image that should be formed, determines, based on the stored image and a set duplication magnification, a size of a recording paper sheet that should be fed manually, and informs a user of the thus determined size of the recording paper sheet. By this configuration, it is intended to inform a user of a size of a recording paper sheet that should be placed and thus to eliminate a burden on the user in an operation of placing a paper sheet (see Patent Document 1: claim 1 and paragraph [0004]).

LIST OF CITATIONS

Patent Literature

Patent Document 1: JP-A-H08-016045

SUMMARY OF THE INVENTION

Technical Problem

When there is a deviation between a paper sheet size recognized by an image forming apparatus (a recognized size) and a size of an actually placed paper sheet, printing may not be able to be performed in an appropriate manner. For example, when an automatic scaling function has been set, a magnification determined by automatic scaling is determined based on a ratio between a document size and a size of a placed paper sheet. When there is a deviation between a recognized size and an actual size, appropriate printing may not be performed. When a magnification is automatically set erroneously to an increased value, not all of a content of a document is printed so as to fit within a paper sheet. Furthermore, an image (a toner image) is formed in a size larger than a size of the paper sheet, resulting in waste of toner. Furthermore, when an automatic magnification is set erroneously to a decreased value, a resulting printed portion is too small with respect to the paper sheet.

As described above, it is required that a paper sheet size to be used in printing be recognized accurately. In order, however, to save a user the trouble of setting a paper sheet size every time he/she performs printing, a sensor that detects a size of a placed paper sheet is provided in the image forming apparatus. Specifically, it is required to recognize a paper sheet size in a sub-scanning direction (a paper sheet conveyance direction) and in a main scanning direction (a direction perpendicular to the paper sheet conveyance direction), respectively. To this end, with respect to each portion in which a paper sheet is placed, such as the paper sheet cassette, a plurality of size detection sensors are provided.

Conventionally, in order to detect a paper sheet size, the manual feed tray also is provided with a size detection sensor. In a case where the size detection sensor of the manual feed tray is omitted (eliminated), instead of size detection of a manual feed paper sheet being performed, a user himself/herself has to perform size setting of a paper sheet placed on the manual feed tray (hereinafter, referred to as a "manual feed paper sheet") every time he/she performs printing. In a case of setting, on an operation panel, a size of a paper sheet placed on the manual feed tray, normally, a plurality of times of transitions of a setting screen have to be undergone. Because of this, some users may find it bothersome to have to perform size setting of a manual feed paper sheet every time they perform printing through paper feeding from the manual feed tray. Furthermore, in a case of the manual feed tray that provides ease in changing a paper sheet, there is a tendency that a paper sheet size is changed a higher number of times than in a case of the paper sheet cassette. Because of this, a user is even more likely to feel botheration. For these reasons, conventionally, the manual feed tray is provided with the size detection sensor as an essential component, which has led to a problem that a manufacturing cost of the image forming apparatus cannot be reduced.

Here, in a technique described in Patent Document 1, a size of a paper sheet that should be placed on the manual feed tray is informed of. In order to inform of this, however, it is a prerequisite that reading of all documents be ended (Patent Document 1: paragraphs [0029] and [0030]). Because of this, a user has to wait till completion of the document reading. After the completion of the document reading, the user places appropriate paper sheets on the manual feed tray. It, therefore, takes a long time from a time of placing the documents to a time of starting copying thereof. In some cases, it is faster to input, on the operation panel, a size of a paper sheet to be placed. Hence, the technique described in Patent Document 1 could not completely eliminate such user's inconvenience and botheration.

In view of the above-described problems with the prior art, the present invention is to, even without providing a sensor for detecting a manual feed paper sheet size, automatically set an appropriate manual feed paper sheet size.

Solution to Problem

In order to achieve the above-described object, an image forming apparatus is provided with a reading unit that includes a document placement detection portion that detects that a document is placed and a document size detection portion that is used to detect a size of the document thus placed, a printing portion that is provided with a manual paper feed portion that supplies a paper sheet to be used for printing and includes a manual feed tray, which itself is not provided with a sensor for detecting a size of a paper sheet placed thereon, and based on image data obtained through reading at the reading unit or received data, performs printing, an operation panel that includes a display portion that displays a setting screen for performing setting related to printing and document reading, accepts the setting related to printing and document reading, and accepts setting for performing paper feeding from the manual paper feed portion, setting of a size of a manual feed paper sheet that is the paper sheet placed on the manual feed tray, and setting of the size of the document placed in the reading unit, and a control portion that, based on automatic detection of a size of a placed document that is the document placed in the reading unit, which is performed based on an output of the document size detection portion, or the setting of the size of the placed document performed on the operation panel, recognizes the size of the placed document, performs manual feed paper sheet automatic setting in which the size of the placed document thus recognized is recognized as the size of the manual feed paper sheet, controls the manual paper feed portion to perform paper feeding, and based on a recognized size that is the size of the paper sheet thus recognized, controls the printing portion to perform printing on a paper sheet fed from the manual paper feed portion.

Advantageous Effects of the Invention

According to the present invention, even without providing a sensor for detecting a manual feed paper sheet size, an appropriate size of a paper sheet placed on a manual feed tray is automatically recognized and set. Furthermore, it is also possible to place a paper sheet to be used for printing as a document so that the paper sheet is detected as the document, and automatically set a size thereof as a manual feed paper sheet size to be used in the printing.

DESCRIPTION OF EMBODIMENTS

With reference to FIG. 1 to FIG. 9, the following describes an embodiment of the present invention. Further, the following description is made by using a multi-functional peripheral 100 (corresponding to an image forming apparatus) as an example. It should be noted, however, that various factors including a configuration, an arrangement, and so on, which are described in each embodiment, do not limit the scope of the invention thereto and are merely illustrative examples.

(Outline of Image Forming Apparatus)

Figure 1:
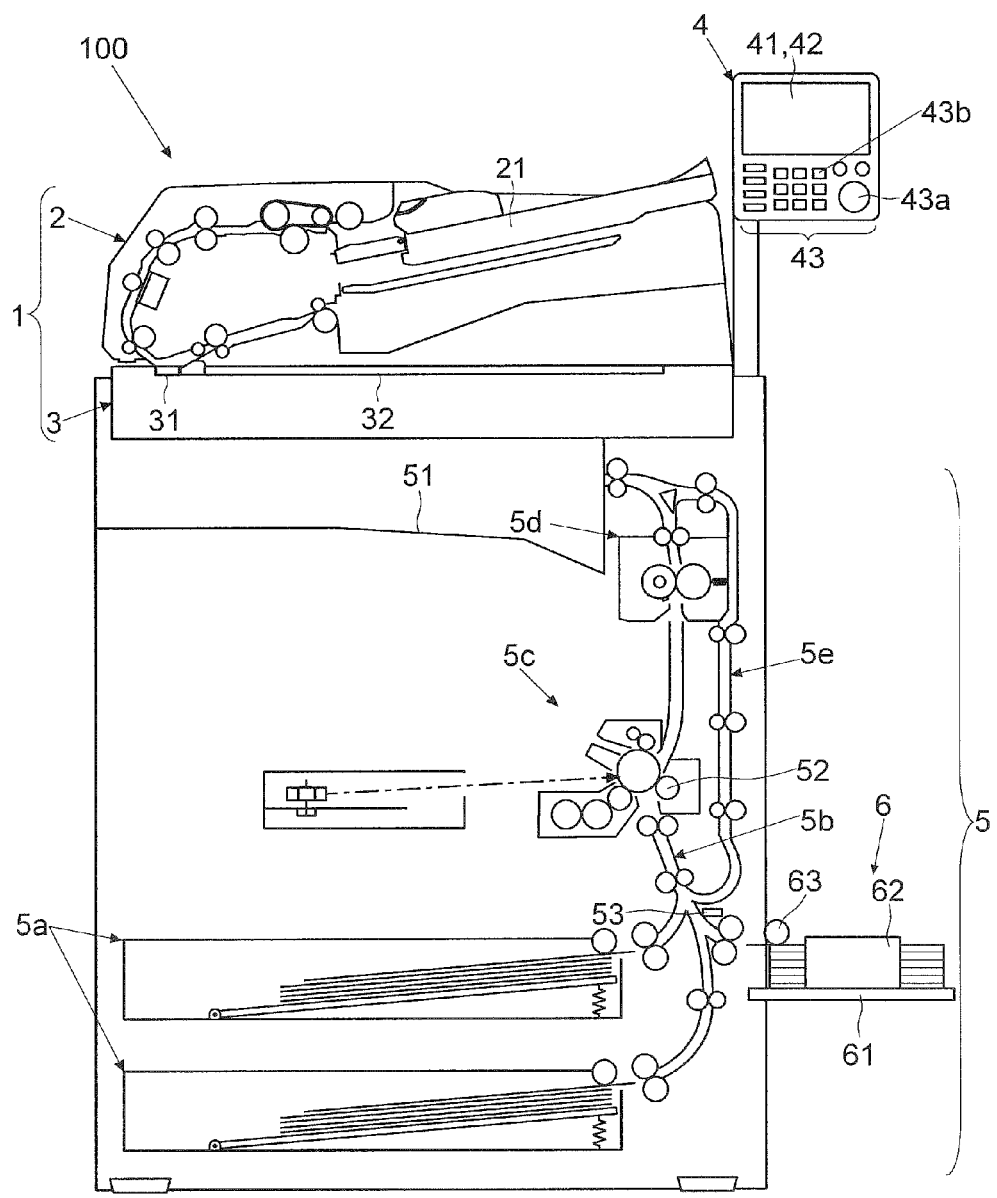
FIG. 1 is a diagram showing a multi-functional peripheral.

First, with reference to FIG. 1, a description is given of the multi-functional peripheral 100 according to the embodiment.

As shown in FIG. 1, the multi-functional peripheral 100 has, in an upper portion thereof, a reading unit 1 including a document conveyance portion 2 and an image reading portion 3. The multi-functional peripheral 100 also has an operation panel 4. Further, the multi-functional peripheral 100 also includes, as a printing portion 5, a paper feed portion 5a (a paper feed cassette), a manual paper feed portion 6, a conveyance portion 5b, an image forming portion 5c, and a fixing portion 5d.

The operation panel 4 is provided with a display portion 41 that displays setting screens related to printing and document reading and various types of messages (a caution, an error, a status, and so on). The operation panel 4 includes a touch panel portion 42 (corresponding to an input portion) that is provided with respect to the display portion 41 and hard keys 43 (corresponding to the input portion) such as a start key 43a for providing an instruction to execute document reading or a copy job and a numeric keypad portion 43b. Further, the operation panel 4 also accepts setting of a printing or a transmission condition such as a size of a paper sheet or a document, and so on. Furthermore, the operation panel 4 accepts setting related to printing and document reading, i.e. accepts setting for performing paper feeding from the manual paper feed portion 6 and setting of a size of a paper sheet (a manual feed paper sheet) placed on a manual feed tray 61. Furthermore, the operation panel 4 accepts setting of a size of a document placed in the reading unit 1 (which will be detailed later).

As shown in FIG. 1, the paper feed portion 5a houses a plurality of paper sheets and feeds out the paper sheets at the time of printing. The paper feed portion 5a includes two paper feed cassettes. At the time of printing, the manual paper feed portion 6 feeds a paper sheet (a manual feed paper sheet) placed on the manual feed tray 61. The manual paper feed portion 6 includes the manual feed tray 61, manual feed restriction plates 62, and a manual paper feed roller 63 that rotates to feed out a manual feed paper sheet. The manual feed restriction plates 62 are a pair of slidable plate-shaped members (in FIG. 1, only one of them is viewable) and restrict a position of a manual feed paper sheet so that a placement position thereof is appropriate. The pair of the manual feed restriction plates 62 are made to slide so that end edges of a paper sheet are aligned along inwardly facing surfaces of both the manual feed restriction plates 62.

The conveyance portion 5b guides a paper sheet supplied from the paper feed portion 5a or the manual paper feed portion 6 to the image forming portion 5c. The image forming portion 5c forms, based on image data, a toner image and transfers the toner image on the paper sheet. The fixing portion 5d heats and presses the paper sheet on which the toner image has been transferred so that the toner image is fixed on the paper sheet. The paper sheet after being subjected to the fixing is ejected onto an ejection tray 51. In a case of duplex printing, a paper sheet that has been subjected to printing on one side thereof and ejected from the fixing portion 5d is switched back and then is sent downward through a duplex printing conveyance portion 5e to be sent again to the image forming portion 5c via the conveyance portion 5b.

(Configuration of Reading Unit 1)

Figure 2:
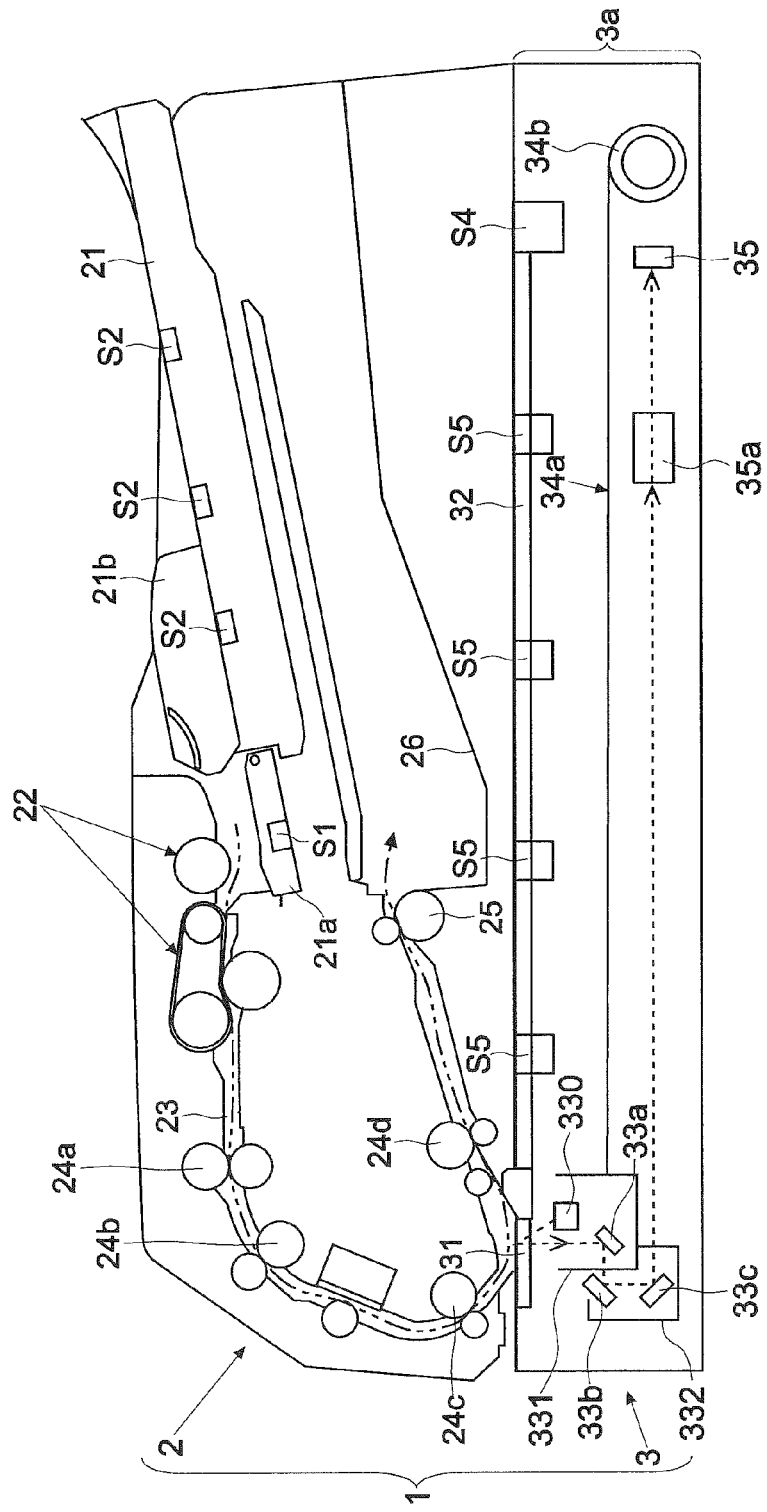
FIG. 2 is a diagram showing a reading unit.

Next, with reference to FIG. 2, a description is given of the reading unit 1 according to the embodiment.

As mentioned above, the reading unit 1 includes the document conveyance portion 2 and the image reading portion 3. First, in a case of reading a document while conveying the document (in a case of feed reading), the document conveyance portion 2 automatically and continuously conveys documents placed therein (placed documents) sheet by sheet to a reading position (a feed reading contact glass 31). Furthermore, about a back side with respect to a paper plane of FIG. 2 as a fulcrum, the document conveyance portion 2 is mounted so as to be freely opened/closed such that a frontward side thereof is swung in an up-and-down direction relative to the image reading portion 3. Thus, in a case of reading of a document loaded on a stationary reading contact glass 32 (in a case of stationary reading), the document conveyance portion 2 functions also as a cover that presses down, from above, the document and the contact glasses.

The document conveyance portion 2 includes, from an upstream side in a document conveyance direction, a document tray 21, a document feed portion 22, a document conveyance path 23, a plurality of document conveyance roller pairs 24 (24a to 24d), a document ejection roller pair 25, and a document ejection tray 26. On the document tray 21, a document is placed in a state where a front side thereof faces upward. A part of the document tray 21 on a downstream side in the document conveyance direction circularly moves (is movable) about a circular movement shaft. Upon detection that a document is placed on the document tray 21 (various types of detection will be detailed later), an end portion of a movable portion 21a on the downstream side in the document conveyance direction circularly moves to ascend so as to bring an uppermost document into contact with the document feed portion 22. When conveyance of all documents is completed or a placed document is removed, the movable portion 21a descends.

Upon an input to perform document reading being inputted to the multi-functional peripheral 100, such as by a touch on the start key 43a, the document feed portion 22 feeds out documents sheet by sheet to the document conveyance path 23 (document feeding). Along the document conveyance path 23, the document conveyance roller pairs 24 convey a document fed out from the document tray 21. Then, the document passes over an upper surface of the feed reading contact glass 31. During this passing, the image reading portion 3 performs reading. Furthermore, the document ejection roller pair 25 ejects the document that have been read onto the document ejection tray 26.

Next, a description is given of the image reading portion 3. As shown in FIG. 1 and FIG. 2, the image reading portion 3 has a box-shaped housing. Further, on a left side on an upper surface of the image reading portion 3, the feed reading contact glass 31 is disposed, over which a document conveyed thereto passes. Further, on a right side on the upper surface of the image reading portion 3, the transparent plate-like stationary reading contact glass 32 is disposed. In a case of reading documents such as a book sheet by sheet, a user lifts up the document conveyance portion 2 and loads, on the stationary reading contact glass 2, the documents with its side to be read facing downward.

Furthermore, as shown in FIG. 2, the image reading portion 3 includes, in the housing, a reading mechanism 3a for reading a document. The reading mechanism 3a includes a first movable frame 331, a second movable frame 332, a wire 34a, a winding drum 34b, a lens 35a, a lamp 330 that irradiates a document with light, such as an LED or a fluorescent tube, and an image sensor 35 on which the light used for the irradiation of the document becomes incident and that is used to read the document line by line to generate image data. As the image sensor 35, a CCD (charge-coupled device) type image sensor can be used in which optoelectronic transducers are arranged in line.

The first movable frame 331 and the second movable frame 332 include the lamp 330, a first mirror 33a, a second mirror 33b, and a third mirror 33c. Light emitted from the lamp 330 and reflected by a document is guided by the mirrors to the lens 35a. Via the lens 35a, the reflection light becomes incident on the image sensor 35. The image sensor 35 can be used for monochrome reading and color reading. A plurality of the wires 34a are attached to the first movable frame 331 and the second movable frame 332 (for the sake of convenience, only one of them is shown in FIG. 2). The other end of each of the wires 34a is connected to the winding drum 34b. By a drive source (a winding motor 3m, see FIG. 4), the winding drum 34b is driven to rotate so that the first movable frame 331 and the second movable frame 332 can freely move in a horizontal direction.

At the time of feed reading (reading of a document being conveyed), after being driven by the winding motor 3m, the first movable frame 331 and the second movable frame 332 have moved from a home position thereof and is secured to a position (the reading position) below the feed reading contact glass 31. On the other hand, at the time of stationary reading (reading of a document on the stationary reading contact glass 32), by the winding drum 34b and the wires 34a, the first movable frame 331 and the second movable frame 332 are made to move from the home position horizontally in a right direction in FIG. 2. In this manner, they are made to continuously perform a scanning operation with respect to an area from a left end of the stationary reading contact glass 32 to an end portion of the document. Based on an output of the image sensor 35, the image reading portion 3 generates image data of the document thus read.

(Hardware Configuration of Multi-Functional Peripheral 100)

Figure 3:
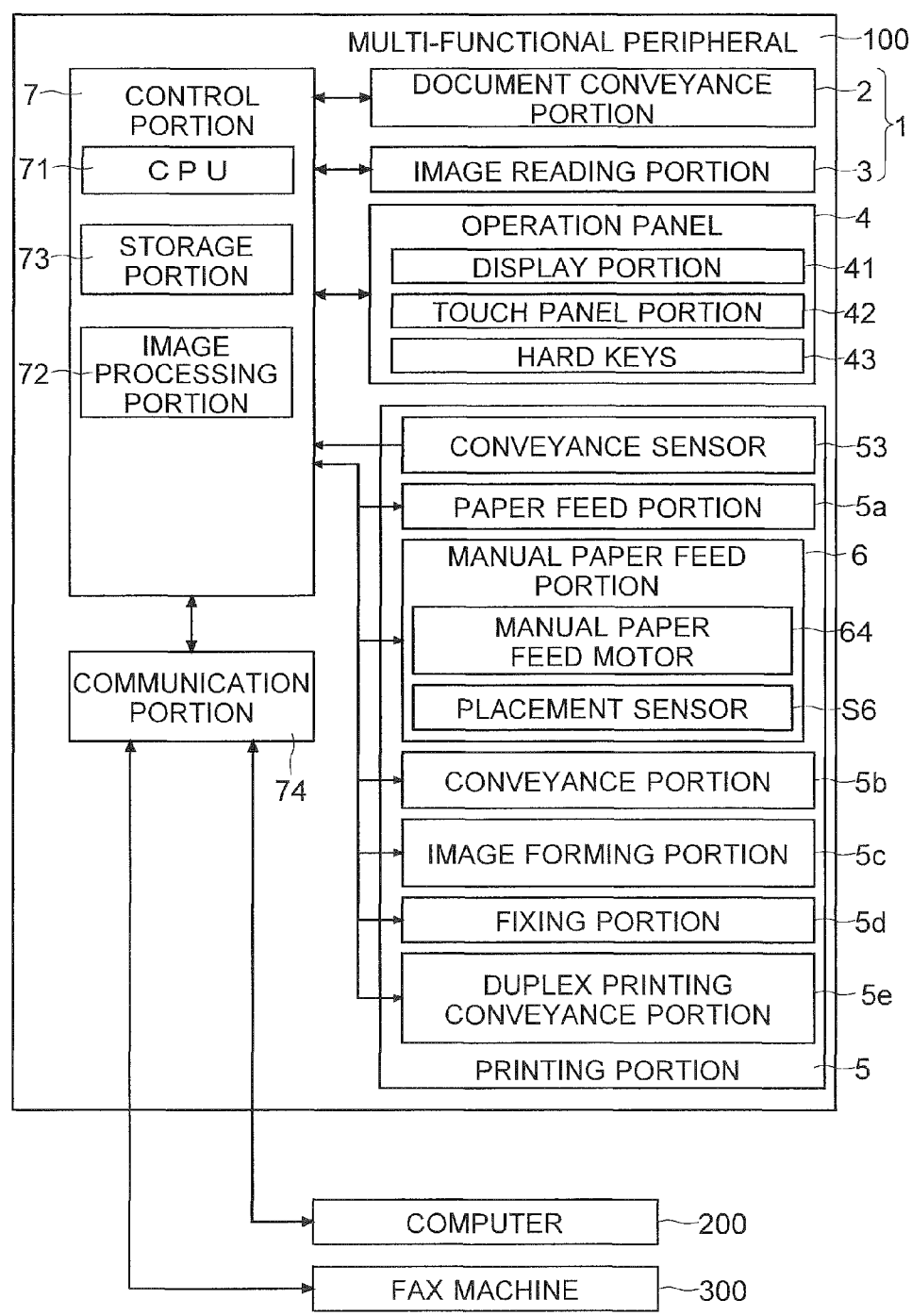
FIG. 3 is a diagram showing a hardware configuration of the multi-functional peripheral.

Next, with reference to FIG. 3, a description is given of a hardware configuration of the multi-functional peripheral 100 according to the embodiment.

As shown in FIG. 3, the multi-functional peripheral 100 includes, inside thereof, a control portion 7. The control portion 7 controls various portions of the apparatus. The control portion 7 includes a CPU 71, an image processing portion 72 that generates image data that is used for printing and transmission, and other electronic circuits and elements.

Based on control programs and control data stored in a storage portion 73, the CPU 71 performs control of the various portions of the multi-functional peripheral 100 and arithmetic calculations. The storage portion 73 is formed as a combination of a nonvolatile storage device such as a ROM, a flash ROM, or an HDD and a volatile storage device such as a RAM.

The control portion 7 is communicably connected to various portions of the printing portion 5 (the paper feed portion 5a, the manual paper feed portion 6, the conveyance portion 5b, the image forming portion 5c, the fixing portion 5d, and the duplex printing conveyance portion 5e). The control portion 7 controls the various portions of the printing portion 5, which perform paper feeding, paper sheet conveyance, and toner image formation, transfer, and fixing, so that image formation is performed in an appropriate manner. A configuration may also be adopted in which, as a substrate separate from the control portion 7, an engine control portion that actually performs control of the printing portion 5 is provided, and based on an instruction from the control portion 7, the engine control portion controls an operation of the printing portion 5. The control portion 7 can control the printing portion 5 so that, based on image data obtained by document reading at the reading unit 1, it performs printing (a copy function).

Furthermore, a communication portion 74 is connected to the control portion 7. Via a network or a cable, the communication portion 74 performs communication with a computer 200 such as a personal computer or a server or a fax machine 300. From the computer 200, the communication portion 74 receives printing data including image data and printing setting. Then, the control portion 7 controls the printing portion 5 to perform printing based on the printing data (a printer function). Furthermore, the communication portion 74 can transmit image data based on document reading by the reading unit 1 to the computer 200 or the fax machine 300 (a transmission function).

The control portion 7 is communicably connected also to the reading unit 1 (the image reading portion 3 and the document conveyance portion 2). The control portion 7 provides operation instructions to the image reading portion 3 and the document conveyance portion 2, respectively, and the image reading portion 3 and the document conveyance portion 2 operate in accordance thereto.

Furthermore, the control portion 7 controls display on the operation panel 4. The control portion 7 recognizes setting performed through an operation with respect to the touch panel portion 42 or the hard keys 43 and a user's instruction, and controls the printing portion 5 and the reading unit 1 to execute a job so as to comply with the user's instruction.

(Operation Control of Reading Unit 1)

Figure 4:
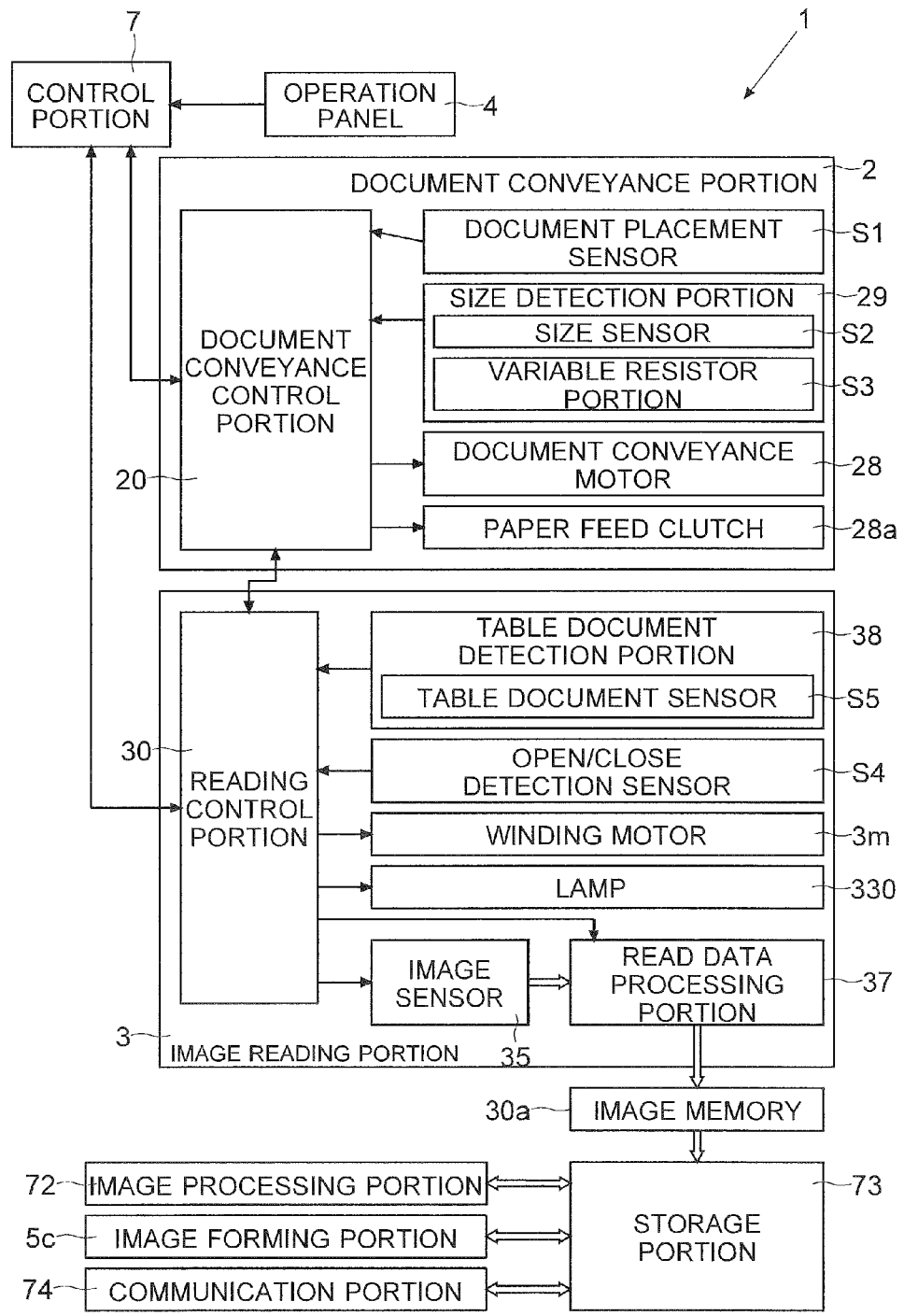
FIG. 4 is a diagram showing the reading unit.

Next, with reference to FIG. 4, a description is given of operation control of the reading unit 1 according to the embodiment.

In the document conveyance portion 2, a document conveyance control portion 20 is provided. The document conveyance control portion 20 is communicably connected to the control portion 7 and a reading control portion 30. Further, based on an instruction or a signal from the control portion 7 or the reading control portion 30, the document conveyance control portion 20 performs operation control of members provided in the document conveyance portion 2. The document conveyance control portion 20 includes a CPU, a ROM, and a RAM.

On the other hand, in the image reading portion 3, the reading control portion 30 is provided. The reading control portion 30 is communicably connected to the control portion 7 and the document conveyance control portion 20. Further, based on an instruction or a signal from the control portion 7 or the document conveyance control portion 20, the reading control portion 30 controls an operation of members provided in the image reading portion 3. The reading control portion 30 also includes a CPU, a ROM, and a RAM.

At the time of performing feed reading, the document conveyance control portion 20 controls a document conveyance motor 28 to be driven so that the document feed portion 22, the document conveyance roller pairs, and the document ejection roller pair 25 are driven to rotate. Thus, documents on the document tray 21 are conveyed sheet by sheet. In order to feed out the documents supplied from the document tray 21 at appropriate timing and at a set sheet interval from each other, a paper feed clutch 28a is provided in the document conveyance portion 2.

Next, a description is given of operation control of the image reading portion 3. The reading control portion 30 is a substrate including a CPU as a central arithmetic processing unit.

At the time of reading a document, the reading control portion 30 controls the winding motor 3m and the winding drum 34b to rotate so as to make the first movable frame 331 and the second movable frame 332 move. Furthermore, at the time of reading a document, the reading control portion 30 controls the lamp 330, the image sensor 35, and a read data processing portion 37 to operate. The read data processing portion 37 corrects an output of each of light-receiving elements in the image sensor 35 and generates image data of the document.

The image data generated by the read data processing portion 37 is transmitted to the storage portion 73 via an image memory 30a for transferring image data. In accordance with a type of a job and user's setting, the image processing portion 72 performs image processing with respect to the image data in the storage portion 73. The image data after being subjected to the image processing is transmitted to an exposure device in the image forming portion 5c and used for a printing job (copying) or transmitted to the communication portion 74 and used for a transmission job.

(Detection in Reading Unit 1)

Next, with reference to FIG. 2 and FIG. 4, a description is given of document-related detection using sensors that are provided in the document conveyance portion 2 and the image reading portion 3. The following description is directed to (1) detection that a document is placed on the document tray 21, (2) detection of a size of a document placed on the document tray 21, (3) detection as to whether the document conveyance portion 2 is opened or closed, and (4) detection that a document is placed on the stationary reading contact glass 32 and detection of a size of the placed document.

(1) Detection that a Document is Placed on the Document Tray 21

As shown in FIG. 2 and FIG. 4, the document conveyance portion 2 includes a document placement sensor S1 (corresponding to a document placement detection portion) for detecting whether or not, on the document tray 21, one or a plurality of documents are placed in an appropriate manner.

As shown in FIG. 2, the document placement sensor S1 is provided in the document tray 21. The document placement sensor S1 is provided at such a position that even when a paper sheet of a specification minimum size is placed on the document tray 21, the document can be detected.

The document placement sensor S1 is a sensor whose output varies depending on whether or not a document is present in a detection region (a sensor installment position). As the document placement sensor S1, a transmission-type optical sensor, a reflection-type optical sensor, or a mechanical switch can be used.

An output of the document placement sensor S1 is inputted to the document conveyance control portion 20. Based on the output of the document placement sensor S1 (depending on whether the output of the document placement sensor S1 is High or Low), the document conveyance control portion 20 detects whether or not a document is placed on the document tray 21. Then, from the document conveyance control portion 20, the reading control portion 30 and the control portion 7 are notified of a fact that a document is placed and a fact that the placed document has run out (variations in output of the document placement sensor S1). Thus, the control portion 7 recognizes whether or not there is a document placed on the document tray 21.

(2) Detection of a Size of a Document Placed on the Document Tray 21

In the document conveyance portion 2, there is provided a size detection portion 29 (corresponding to a document size detection portion) for detecting a size of a document loaded (placed) on the document tray 21.

In order to detect a document size in a document conveyance direction (a sub-scanning direction) of a document placed on the document tray 21, the size detection portion 29 includes a plurality of size sensors S2. The size sensors S2 are provided at a plurality of positions on an upper surface of the document tray 21 along the document conveyance direction. The size sensors S2 detect whether or not a document is present on the upper surface. The size sensors S2 have an output that varies depending on whether or not a document is present above them. As each of the size sensors S2, similarly to the document placement sensor S1, a transmission-type optical sensor, a reflection-type optical sensor, or a mechanical switch can be used.

Outputs of the size sensors S2 are inputted to the document conveyance control portion 20. Based on the outputs of the size sensors S2 (depending on whether the outputs of the size sensors S2 are High or Low), the document conveyance control portion 20 detects a size (a range) of a document in the document conveyance direction on the document tray 21. In FIG. 2, when a document has been placed, the document conveyance control portion 20 recognizes that a size of the document in the sub-scanning direction is longer than a distance from a rightmost one of the size sensors S2, which has successfully detected presence of the document, to a left end of the document tray 21 and shorter than a distance from a leftmost one of the size sensors S2, which has not detected the presence of the document, to the left end of the document tray 21. In other words, the document conveyance control portion 20 recognizes a range of a length of the document in the sub-scanning direction.

Furthermore, the size detection portion 29 includes a variable resistor portion S3. The variable resistor portion S3 functions as a sensor for detecting a document size in a direction (a main scanning direction) perpendicular to the conveyance direction of a document placed on the document tray 21.

Specifically, in the document tray 21, there is provided a pair of document restriction plates 21b that hold a document therebetween in the main scanning direction so as to restrict a position thereof (see FIG. 2). The pair of document restriction plates 21b moves by sliding symmetrically with respect to a preset center line. The pair of document restriction plates 21b slide so as to hold a document therebetween in the main scanning direction and thus restrict a position of the document. A slide mechanism (not shown) of the pair of document restriction plates 21b is connected to a movable terminal (a resistance value adjusting terminal) of a variable resistor. Further, a resistance value of the variable resistor varies depending on a position of the pair of document restriction plates 21b, as a result of which an output value of the variable resistor portion S3 varies.

An output of the variable resistor portion S3 is inputted to the document conveyance control portion 20. Based on an output value of the variable resistor portion S3, the document conveyance control portion 20 accurately detects a document size in the main scanning direction (a forward-rearward direction). Then, the document conveyance control portion 20 compares a size (a range) of the document in the sub-scanning direction obtained by the size sensors S2 with a size thereof in the main scanning direction, and recognizes a regular paper sheet size corresponding to a result of the comparison. Then, from the document conveyance control portion 20, the control portion 7 is notified of the recognized respective sizes of the document in the main scanning direction and in the sub-scanning direction. Thus, the control portion 7 recognizes a size (which regular size corresponds thereto) of a placed document on the document tray 21.

(3) Detection as to Whether the Document Conveyance Portion 2 is Opened or Closed Next, a description is given of detection as to whether the document conveyance portion 2 is opened or closed. In order to place a document on the stationary reading contact glass 32, the document conveyance portion 2 can be opened/closed. In order, therefore, to open/close the document conveyance portion 2, a rotary shaft (a hinge) is provided on a back side of the multi-functional peripheral 100 (not shown).

In order to detect whether the document conveyance portion 2 is opened or closed, as shown in FIG. 2 and FIG. 4, in the image reading portion 3, an open/close detection sensor S4 (corresponding to a document placement detection portion and a document size detection portion) is provided. Further, in order to perform open/close detection, a part of the open/close detection sensor S4 is exposed to the upper surface of the image reading portion 3. The open/close detection sensor S4 includes a protrusion (not shown) that is biased to protrude upward.

As the document conveyance portion 2 in an opened (lifted-up) state is closed (pulled down), a lower surface of the document conveyance portion 2 and the protrusion come into contact with each other, and the protrusion then is pressed into the open/close detection sensor S4. On the other hand, as the document conveyance portion 2 is lifted up, a protrusion amount of the protrusion increases. Further, an output of the open/close detection sensor S4 varies depending on whether or not the protrusion amount of the protrusion exceeds a set value.

In the reading unit 1 of this embodiment, depending on whether an angle formed between the lower surface of the document conveyance portion 2 and the upper surface (the stationary reading contact glass 32) of the image reading portion 3 is not less than a prescribed angle (for example, about 15 to 45 degrees) or less than that, an output value of the open/close detection sensor S4 is switched (High to Low or Low to High).

Further, an output of the open/close detection sensor S4 is inputted to the reading control portion 30. Based on an output value of the open/close detection sensor S4, the reading control portion 30 detects whether the document conveyance portion 2 is in an opened state (at an angle not less than the prescribed angle) or in a closed state (at an angle less than the prescribed angle). The open/close detection sensor S4 is only required to be able to detect whether the document conveyance portion 2 is in the opened state or in the closed state. Therefore, The open/close detection sensor S4 is not limited to the same types of sensors as those described above. When the open/close detection sensor S4 has an output value indicating the opened state (when the document conveyance portion 2 is regarded as having been opened) and when the open/close detection sensor S4 has an output value indicating the closed state (when the document conveyance portion 2 is regarded as having been closed), from the reading control portion 30, the control portion 7 is notified of such facts. Thus, the control portion 7 recognizes whether the document conveyance portion 2 is in the opened state or in the closed state.

(4) Detection of Presence/Absence of a Document on the Stationary Reading Contact Glass 32 and a Size of a Placed Document As shown in FIG. 2 and FIG. 4, in the image reading portion 3, there is provided a table document detection portion 38 (corresponding to the document placement detection portion and the document size detection portion) for detecting whether or not a document is placed on the stationary reading contact glass 32 and detecting a size of a placed document.

When an operation of closing the document conveyance portion 2 has been performed (before the document conveyance portion 2 is completely closed), the table document detection portion 38 detects presence/absence of a document placed on the stationary reading contact glass 32 and a document size in the sub-scanning direction. In order to perform the size detection, the table document detection portion 38 includes a plurality of table document sensors S5. Each of the table document sensors S5 is a sensor that detects whether or not a document is present on an upper surface thereof. The table document sensors S5 are provided below the stationary reading contact glasses 32 along an upper edge end thereof (an end edge thereof in the back side).

The table document sensors S5 have an output that varies depending on whether presence of a document has been detected or no document is present. As each of the table document sensors S5, there is used a sensor that can detect presence of a document without interfering with reading of the document, such as a reflection-type optical sensor. Outputs of the table document sensors S5 are inputted to the reading control portion 30. A document is loaded relative to an upper left corner of the stationary reading contact glass 32. Then, based on outputs of the table document sensors S5 (depending on whether the outputs of the table document sensors S5 are High or Low), the reading control portion 30 detects presence/absence of the document on the stationary reading contact glass 32 and a range of a size of the document in the sub-scanning direction.

The reading control portion 30 detects that the size of the document in the sub-scanning direction is longer than a width from a rightmost one of the table document sensors S5, which has successfully detected presence of the document, to a left end of the stationary reading contact glass 32 and narrower than a width from a leftmost one of the table document sensors S5, which has not successfully detected presence of the document, to the left end of the stationary reading contact glass 32. When all the table document sensors S5 have not detected presence of a document, the reading control portion 30 judges that there is no document placed.

Furthermore, in the reading unit 1 of this embodiment, when an operation of closing the document conveyance portion 2 has been performed (before the document conveyance portion 2 is completely closed), pre-scanning is performed. Pre-scanning refers to reading for detecting presence/absence of a document loaded on the stationary reading contact glass 32 and a document size in the main scanning direction.

After detecting that the document conveyance portion 2 has been opened, the image reading portion 3 performs pre-scanning by using a fact, as a trigger, that the document conveyance portion 2 has been closed past the prescribed angle (a fact that an output value of the open/close detection sensor S4 has shifted from an output value indicating the opened state to an output value indicating the closed state). In other words, the image reading portion 3 performs pre-scanning in a state where the document conveyance portion 2 is opened a little.

Further, at the time of executing the pre-scanning, the image reading portion 3 operates the winding motor 3*m* so that the first movable frame 331 and the second movable frame 332 move to a pre-scanning position below the stationary reading contact glass 32. After completion of the pre-scanning, the reading control portion 30 controls the first movable frame 331 and the second movable frame 332 to return to the home position.

In an area where a document is present, light of the lamp 330 is reflected by the document. Because of this, in image data obtained by the pre-scanning, those pixels which correspond to a position at which the document is present have a bright (white) pixel value. In an area where there is no document, there occurs no reflection of light of the lamp 330 by a document, and thus, those pixels which correspond to that area have a deep (dark) pixel value. Based on this, the reading control portion 30 detects, in image data along a line in the main scanning direction obtained by the pre-scanning, a boundary between a pixel value deeper than a threshold value and a light pixel value not more than the threshold value. Then, based on the number of continuous pixel values not less than the threshold value, the number of continuous pixel values less than the threshold value, and a distance from the boundary to a reference point (an upper end or a lower end) for placing a document on the stationary reading contact glass 32, the reading control portion 30 can substantially accurately detect a size of the document in the main scanning direction. The reading control portion 30 notifies the control portion 7 of the thus recognized size of the document in the main scanning direction and the range of the size thereof in the sub-scanning direction. Thus, the control portion 7 also recognizes a size (which regular size corresponds thereto) of a document placed on the stationary reading contact glass 32.

On the other hand, when, in image data obtained by pre-scanning, there is no pixels brighter than the threshold value, the reading control portion 30 judges that there is no document placed on the stationary reading contact glass 32. Specifically, when the boundary cannot be defined or when the number of pixels brighter than the threshold value is not more than a prescribed number, the image reading portion 3 determines that there is no document placed. Based on output values of the plurality of table document sensors S5 and a result of the pre-scanning, the control portion 7 can detect and recognize presence/absence of a document on the stationary reading contact glass 32.

(Setting Performed at Time of Using Copy Function)

Figure 5A:
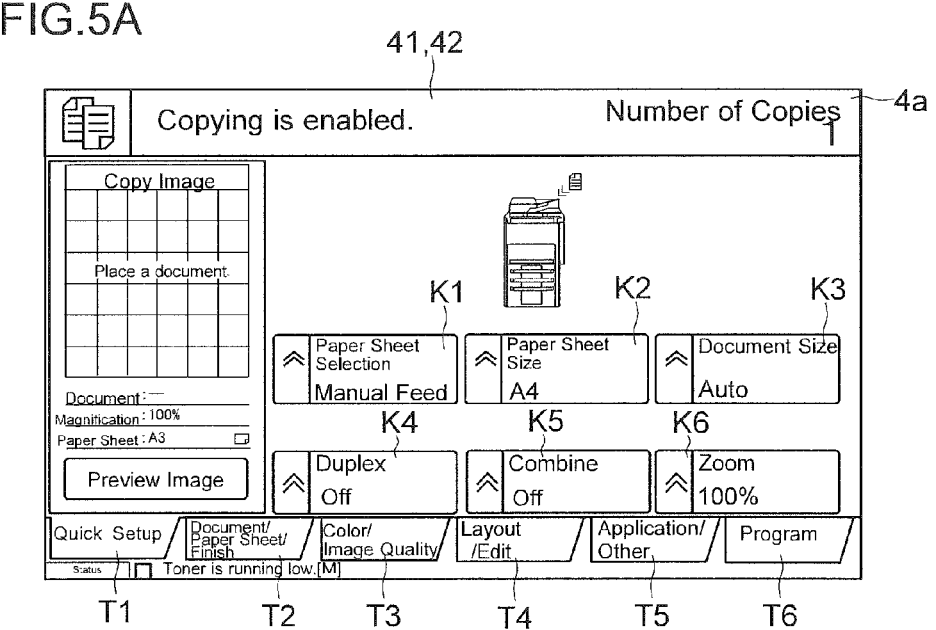
FIG. 5A is a diagram showing one example of a copy initial screen of a copy function.
Figure 5B:
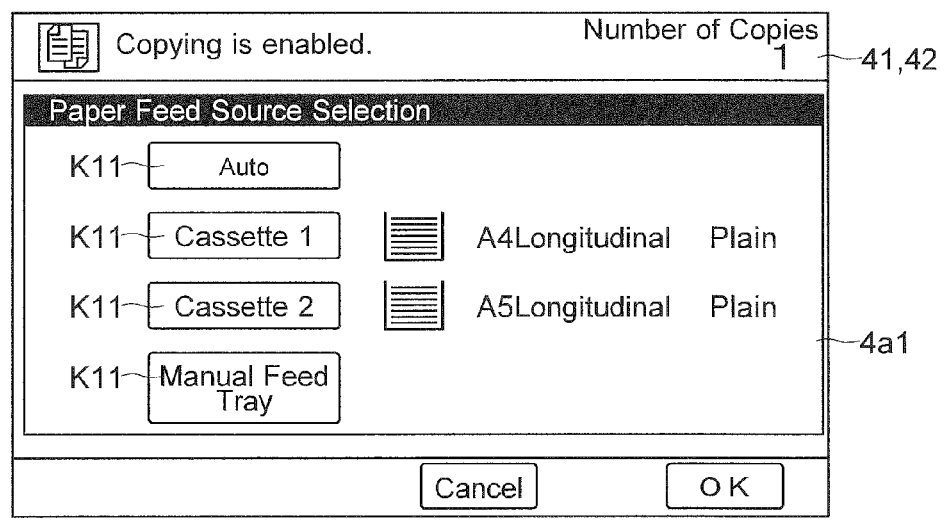
FIG. 5B is a diagram showing one example of a paper feed source selection screen.
Figure 5C:
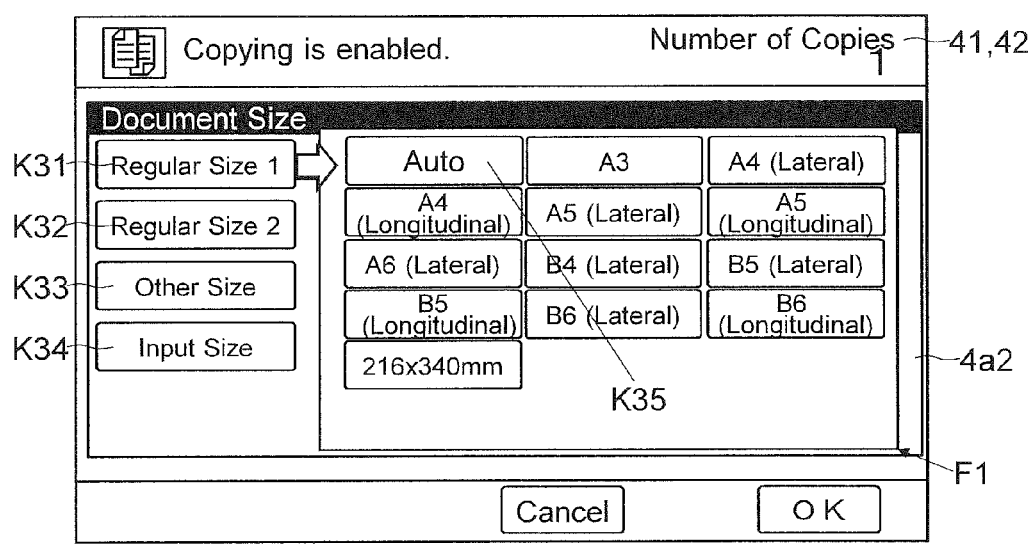
FIG. 5C is a diagram showing one example of a document size setting screen.

Next, with reference to FIG. 5A, FIG. 5B, and FIG. 5C, a description is given of one example of setting that is performed at the time of using the copy function. FIG. 5A is a diagram showing one example of a copy initial screen 4a of the copy function. FIG. 5B is a diagram showing one example of a paper feed source selection screen 4a1. FIG. 5C is a diagram showing one example of a document size setting screen 4a2.

The display portion 41 of the operation panel 4 displays various types of setting screens. In accordance with an operation with respect to a soft key in a setting screen or the hard keys 43, the display portion 41 performs switching of a setting screen to be displayed. Further, when an operation for selecting the copy function with respect to the hard keys 43 has been performed or when a selection to use the copy function (a selection to perform a copy job) has been made on a main menu screen (not shown) displayed on the display portion 41, the control portion 7 controls the display portion 41 to display the copy initial screen 4a (see FIG. 5) related to the copy function.

The copy initial screen 4a is a hierarchically top-level one of various setting screens of the copy function. Setting screens of other functions (functions such as scan transmission and boxing) are also prepared, descriptions of which are omitted.

The copy initial screen 4a is first displayed in a state where a simple setting tab T1 (a tab including a character string "Quick Setup") is selected. In the state where the simple setting tab T1 is selected, an example is shown in which, upon the simple setting tab T1 being selected, there are displayed setting item keys K1, K2, K3, K4, K5, and K6 corresponding to "Paper Sheet Selection", "Paper Sheet Size Selection", "Document Size Selection", "Duplex Printing", "Combination Printing", and "Enlargement/Reduction", respectively. Upon a display position of any one of the setting item keys K1 to K6 being touched, the display portion 41 displays a setting screen for setting a set value of a setting item selected by the touch.

When the display position of a setting item "Paper Sheet Selection" (the setting item key K1) has been touched, the display portion 41 displays the paper feed source selection screen 4a1 (see FIG. 5B) for selecting a paper feed position. In the paper feed source selection screen 4a1 in FIG. 5B, an example is shown in which, as candidates for a paper feed source, the two paper sheet cassettes of the paper feed portion 5a and the manual feed tray 61 (the manual paper feed portion 6) are displayed. In the screen, paper feed source selection keys K11 are disposed. The paper feed source selection keys K11 are each provided therein with any one of character strings indicating the paper sheet cassettes and the manual feed tray 61, respectively. A user operates one of the paper feed source selection keys K11 that corresponds to a desired paper feed source. Thus, any one of the paper sheet cassettes and the manual paper feed portion 6 can be set as a paper feed source. Furthermore, by operating one of the paper feed source selection keys K11 that includes a character "Auto" (automatic), it is also possible to set the control portion 7 to automatically select a paper feed source in accordance with a detected document size and a magnification. By operating an OK key, the selling of a paper feed source can be completed. FIG. 5A shows a state where the manual paper feed portion 6 (the manual feed tray 61) is set as a paper feed source.

Specifically, at the time of performing printing through paper feeding from the manual feed tray 61, it is required that the manual feed tray 61 be set as a paper feed source. The operation panel 4 (the touch panel portion 42) accepts an operation with respect to one of the paper feed source selection keys K11 that is denoted "Manual Feed Tray" in the paper feed source selection screen 4a1 as an operation of setting the manual feed tray 61 as a paper feed source.

When the display position of the setting item key K2 denoted "Paper Sheet Size Selection" has been touched, the display portion 41 displays a screen for setting a size of a paper sheet placed in either of the paper feed cassettes or on the manual feed tray 61 (not shown). In paper sheet size setting, the display portion 41 displays a list of regular sizes usable in the multi-functional peripheral 100. The operation panel 4 (the touch panel portion 42) accepts, as a manual feed paper sheet size, a size selected from among the regular sizes thus displayed. Furthermore, in some cases, it is desired that a paper sheet of a custom size (a paper sheet of a non-regular size) be placed on the manual feed tray 61 and used for printing. To that end, the display portion 41 also displays a screen for inputting a numerical value of a manual feed paper sheet size. Further, the operation panel 4 (the touch panel portion 42) accepts a size whose numerical value has been inputted as a manual feed paper sheet size. FIG. 5A shows a state where an A4 size is set as a manual feed paper sheet size.

When the display position of the setting item key K3 denoted "Document Size Selection" has been touched, the display portion 41 displays the document size setting screen 4a2 (FIG. 5C) for setting a size of a document placed on the document tray 21 or on the stationary reading contact glass 32.

As shown in FIG. 5C, on the document size setting screen 4a2, four category keys for selecting a category of a document size are displayed. A first regular size key K31 is a key corresponding to an A-type paper sheet or a B-type paper sheet. A second regular size key K32 is a key corresponding to an inch-based paper sheet such as a paper sheet of a letter size. An other size key K33 is a key corresponding to a paper sheet of a size categorized as not applying to any of the A-type paper sheet such as a regular-size post card, the B-type paper sheet, and the inch-based paper sheet.

When a display position of any of the first regular size key K31, the second regular size key K32, and the other size key K33 has been touched, the display portion 41 displays, in a paper sheet size key display region F1 that is disposed on a right side of the category keys, keys corresponding to different paper sheet sizes, respectively, which are allotted to each of the categories. FIG. 5C shows an example in which, by an operation with respect to the first regular size key K31, keys corresponding to various types of A-type paper sheets and B-type paper sheets are itemized in list form. The operation panel 4 (the touch panel portion 42) accepts, as an input to designate a size of a placed document, an operation of selecting one of the thus displayed keys corresponding to the regular sizes, respectively. The control portion 7 recognizes a size corresponding to the thus operated one of the keys as the size of the placed document.

Furthermore, the operation panel 4 (the touch panel portion 42) also accepts setting regarding automatic detection of a document size. The operation panel 4 accepts a touch on a display position of one of the keys that includes a character "Auto" (a document size automatic detection key K35) as the setting for performing automatic detection of a document size (see FIG. 5C). In this case, a document size obtained by the automatic detection is any one of the regular sizes. Default setting is such that a document size is automatically detected.

Furthermore, a user can also set a non-regular size (custom size) as a document size. Upon a display position of a size input key K34 being touched, the operation panel 4 (the touch panel portion 42) displays a screen for setting (custom-size) dimensions of a document by manual input (for example, by inputting numerical values to the numeric keypad portion 43b). The user can input and set actual dimensions of a document of a non-regular size. The operation panel 4 accepts the numerical values thus inputted as a size of a placed document.

When a display position of the setting item key K4 denoted "Duplex Printing" has been touched, there is displayed a setting screen (not shown) for setting a set value as to whether one or both sides of a document are to be printed. Furthermore, when a display position of the setting item key K5 denoted "Combination Printing" has been touched, there is displayed a setting screen (not shown) for setting a set value of the number of pages to be combined into one page, such as "2 in 1" or "4 in 1", or a set value as to whether or not a boundary line is to be provided between the combined pages.

When a display position of the setting item key K6 denoted "Magnification" has been touched, the display portion 41 displays a setting screen (not shown) for setting a magnification at which an image is formed with respect to a document size (a size of printed matter where a document size is assumed to be 1). For example, the magnification can be set to a value between 50% and 200% in increments of 1%. FIG. 5A shows a state where an equal magnification (100%) is set. It is also possible to set, based on an automatically detected document size or a document size and a size of a paper sheet (including a manual feed paper sheet), a set value of automatic zooming in which a magnification is automatically set. A data table determining appropriate magnifications corresponding to dimensions of document sizes and paper sheet sizes, respectively, is stored in the storage portion 73.

Furthermore, in order to set setting items that are not displayed on the copy initial screen 4a (for example, setting items such as frame erasure, margins, and a reading resolution), a user touches respective display positions of a document/paper sheet/finish tab T2, a color/image quality tab T3, a layout edit tab T4, an application/other tab T5, and a program tab T6. Each of the setting items is pre-associated with any one of these tabs. The display portion 41 displays a screen that displays, in list form, ones of the setting items (setting item keys) that are associated with one of the tabs that is designated by the touch.

Further, the control portion 7 is notified of a content set on the operation panel 4. By the notification from the operation panel 4, the control portion 7 recognizes the content set on the operation panel 4 (a paper feed source, a size of a placed paper sheet, a document size, or the like).

(Manual Feed Paper Sheet Automatic Setting)

Figure 6:
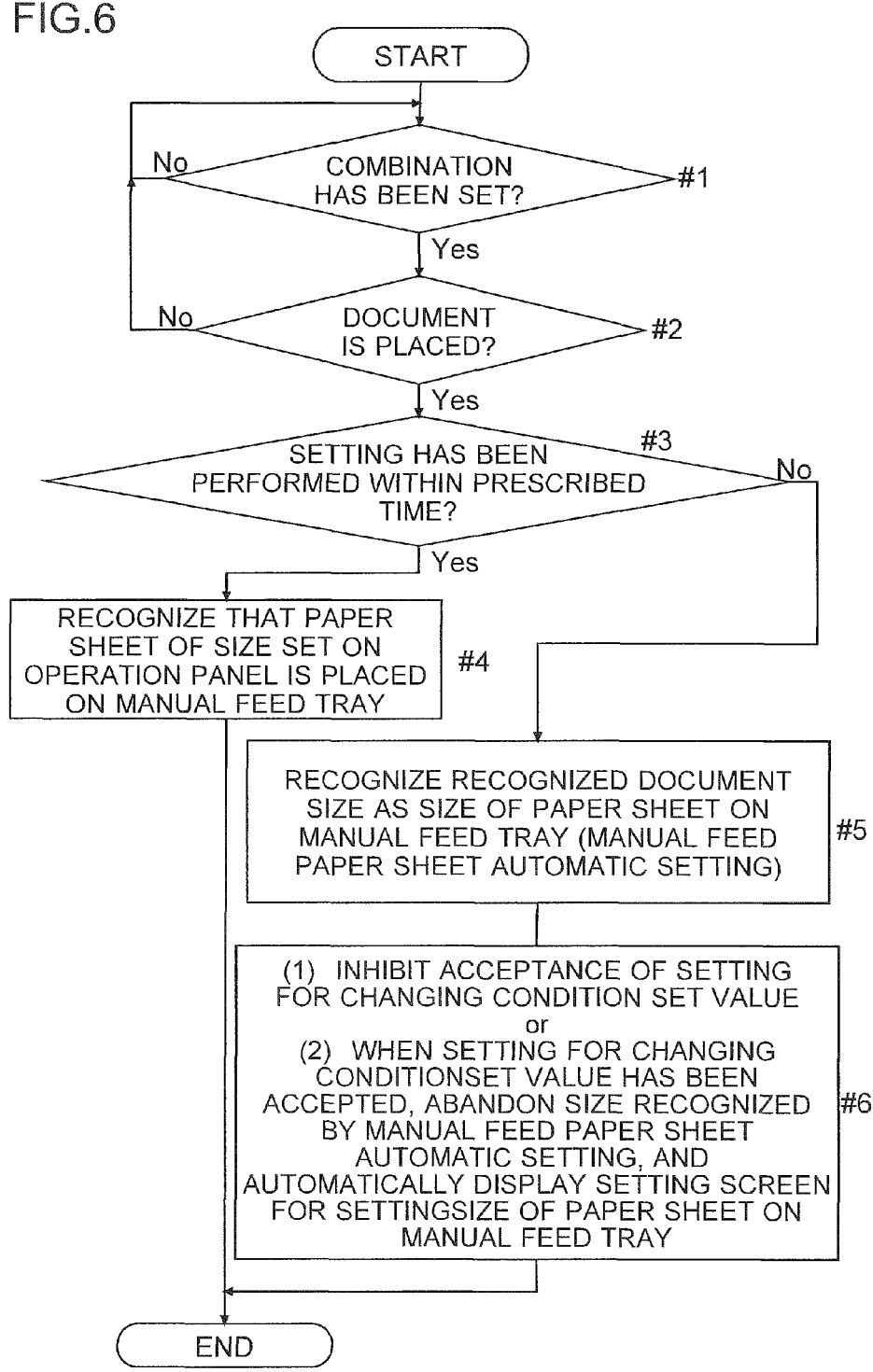
FIG. 6 is a flow chart showing one example of manual feed paper sheet automatic setting.

Next, with reference to FIG. 6, a description is given of one example of a flow of manual feed paper sheet automatic setting in a copy job.

When setting for performing paper feeding from the manual paper feed portion 6 has been performed on the operation panel 4 or the like, and a paper sheet to be used for printing is supplied from the manual feed tray 61, the control portion 7 controls a manual paper feed motor 64 to rotate. This makes the manual paper feed roller 63 rotate. There may be provided a placement sensor S6 for detecting whether or not a paper sheet is placed on the manual feed tray 61 (see FIG. 3). Based on an output of the placement sensor S6, the control portion 7 can recognize presence/absence of a paper sheet on the manual feed tray 61.

Here, in the manual paper feed portion 6 (the manual feed tray 61 itself), a sensor for detecting a size of a placed paper sheet is not provided. This can reduce a manufacturing cost of the image forming apparatus (the multi-functional peripheral 100). In this case, however, a manual feed paper sheet size cannot be detected. When a size of a paper sheet to be used for printing is unknown, appropriate printing may not be able to be performed. Furthermore, a width of a formed image (a toner image) in the main scanning direction cannot be determined. As a solution to this, on the operation panel 4, setting for performing paper feeding from the manual paper feed portion 6 and setting of a manual feed paper sheet size can be performed. The control portion 7 recognizes the size thus set as a manual feed paper sheet size (recognized size).

Some users may, however, find it bothersome to set a manual feed paper sheet size every time they perform printing. In order to eliminate a user's botheration, the control portion 7 performs automatic setting of a manual feed paper sheet size (manual feed paper sheet automatic setting). Thus, at the time of executing a copy job by using the manual feed tray 61, it is no longer necessary to always set a paper sheet size on the operation panel 4. Furthermore, it is also possible to temporarily place a paper sheet to be used for printing as a document so that a size thereof is automatically set as a manual feed paper sheet size to be used in the printing.

With reference to FIG. 6, a description is given of a flow of manual feed paper sheet automatic setting. START in FIG. 6 refers to a point in time when setting on the operation panel 4 is started by a user.

First, the control portion 7 confirms a content of setting of a copy job performed on the operation panel 4 and continuously confirms whether or not all condition set values included in a prescribed combination have been set (Step #1, No at Step #1→Step #1). Of various types of set values, a condition set value is a set value that is used to judge whether or not to perform automatic setting of a manual feed paper sheet size. The condition set value is preset, and there are a plurality of types of condition set values (which will be detailed later). Furthermore, a prescribed combination of condition set values is determined (which will be described later).

Further, when all the condition set values included in the prescribed combination have been set (when a last remaining unset one of the condition set values included in the prescribed combination has been set), manual feed paper sheet automatic setting is executed. A configuration may also be adopted in which the confirmation at Step #1 is omitted, and the control portion 7 immediately recognizes a size of a place document as a manual feed paper sheet size.

Subsequently, the control portion 7 confirms whether or not a state is established in which a document is placed in the reading unit 1 (whether or not a document has been placed or whether or not a document has been newly set) (Step #2). Specifically, the control portion 7 confirms, based on a notification from the document conveyance control portion 20, whether or not a document is placed on the document tray 21, and, based on a notification from the reading control portion 30, whether or not a document is placed on the stationary reading contact glass 32.

Whether or not a document is placed on the document tray 21 is judged based on an output value of the document placement sensor S1. Furthermore, whether or not a document is placed on the stationary reading contact glass 32 is judged based on detection of a paper sheet size in the main scanning direction in pre-scanning performed when the document conveyance portion 2 is opened/closed and outputs of the table document sensors S5.

When no document is placed (No at Step #2), the flow returns to Step #1. On the other hand, when a state is established in which a document is placed in the reading unit 1 (Yes at Step #2), the control portion 7 confirms whether or not, between a point in time when all the condition set values included in the prescribed combination are set and a point in time a prescribed length of time earlier than that point in time, a manual feed paper sheet size has been set by an input on the operation panel 4 (Step #3). The purpose of this is to give a higher priority to a size set by a user. Here, the prescribed length of time is a length of time that can be determined as appropriate. The prescribed length of time is a length of time obtained by adding a margin of error (for example, 2 to 3 minutes) to a length of time estimated to be required from when a document is placed to when all the condition set values included in the prescribed combination are set.

When, within the prescribed length of time, a manual feed paper sheet size has been set (Yes at Step #3), the control portion 7 recognizes that a paper sheet of a size set on the operation panel 4 is placed on the manual feed tray 61 (Step #4).

On the other hand, when, within the prescribed length of time, a manual feed paper sheet size has not been set on the operation panel 4 (No at Step #3), the control portion 7 recognizes, as a manual feed paper sheet size, a recognized size of a placed document (a size of the placed document set on the document size setting screen 4*a*2 by a user or a size of the placed document automatically detected based on an output of the document size detection portion) (manual feed paper sheet automatic setting. Step #5). That is, in a state of recognizing the size of the document placed in the reading unit 1, by using a fact, as a trigger, that all the condition set values included in the prescribed combination are set, the control portion 7 performs manual feed paper sheet automatic setting. In a state where not all the condition set values included in the prescribed combination are set, even when recognizing the size of the document placed in the reading unit 1, the control portion does not perform manual feed paper sheet automatic setting.

As described above, in the multi-functional peripheral 100 of this embodiment, a size of a placed document and a manual feed paper sheet size are automatically set as being the same. Accordingly, the condition set value is a set value that is set in a case where a size of a placed document and a manual feed paper sheet size may be regarded as being the same (a copy job may be expected to be performed by using a paper sheet of the same size as that of a placed document).

As the condition set value, there are used a set value setting the manual paper feed portion 6 as a paper feed source, a set value setting a printing magnification to an equal magnification, a set value setting a document size to be automatically detected based on an output of the document size detection portion (the size sensors S2, the variable resistor portion S3, the table document sensors S5, and the reading mechanism 3*a*), and a set value set by designating a size of a placed document.

The prescribed combination of condition set values is determined. One of the prescribed combinations is composed of the set value setting the manual paper feed portion 6 as a paper feed source, the set value setting an equal magnification, and the set value setting a document size to be automatically detected based on an output of the document size detection portion (an operation with respect to the document size automatic detection key K35, see FIG. 5C).

In this combination, the set value setting the manual paper feed portion 6 as a paper feed source is a set value that is used as a precondition for performing a copy job through paper feeding from the manual feed tray 61. When a user has performed setting for automatically detecting a document size and setting for using an equal magnification, it is extremely likely that the user desires to perform printing on a paper sheet of the same size as that of a document. For this reason, these condition set values are preset as the one of the prescribed combinations. When all the condition set values included in this prescribed combination have been set, the control portion 7 recognizes an automatically detected size of a placed document as a manual feed paper sheet size (manual feed paper sheet automatic setting).

Another one of the prescribed combinations is composed of the set value setting the manual paper feed portion 6 as a paper feed source, the set value setting an equal magnification, and a set value set by designating a size of a placed document (a specific document size designated on the document size setting screen 4*a*2, see FIG. 5C).

In this prescribed combination, the set value setting the manual paper feed portion 6 as a paper feed source is a set value that is used as a precondition. When having designated a document size such as a custom size or a regular size on the document size setting screen 4*a*2, a user has fully recognized a size of a document. Moreover, when having set a magnification to an equal magnification, the user has recognized that, even when the document is copied at an equal magnification, on a paper sheet placed on the manual feed tray 61, printing can be performed in such a manner as not to extend outside the paper sheet. In other words, when having set the manual paper feed portion 6 as a paper feed source, set an equal magnification, and designated a document size, a user knows that a paper sheet of a size not smaller than the set document size should be placed on the manual feed tray 61. Accordingly, even when equal magnification printing is performed on the assumption that the set document size is a size of a paper sheet placed on the manual feed tray 61, it is unlikely that a content of the document is printed in such a manner as to extend outside the paper sheet. For this reason, these condition set values are preset as the one of the combinations. When all the condition set values included in this combination have been set, the control portion 7 recognizes a designated size of a placed document as a manual feed paper sheet size (manual feed paper sheet automatic setting).

There may be even more types of condition set values and prescribed combinations.

Then, when manual feed paper sheet automatic setting has been performed (Step #5), the control portion 7 performs prohibition-related processing (Step #6). Specifically, as the prohibition-related processing, (1) the control portion 7 does not accept setting for changing a condition set value, or (2) when the operation panel 4 has accepted setting for changing a condition set value, the control portion 7 abandons a result of recognizing a paper sheet size obtained by the manual feed paper sheet automatic setting. Upon the abandonment, the control portion 7 controls the display portion 41 to automatically display a setting screen for setting a manual feed paper sheet size. The setting screen for setting a manual feed paper sheet size is the same setting screen as the aforementioned setting screen displayed when the setting item key K2 denoted "Paper Sheet Size Selection" has been operated.

The prohibition-related processing described in (1) is such that once the control portion 7 has recognized an appropriate size as a manual feed paper sheet size, setting for setting a size different from the recognized size as an appropriate paper sheet size is prohibited (inhibited). In other words, there is performed processing of maintaining a state where an appropriate recognized size is set.

The prohibition-related processing described in (2) is such that, although an appropriate size has been recognized once as a manual feed paper sheet size, it is allowed to set a paper sheet size different from the recognized size as an appropriate size.

Since the manual feed paper sheet size is in a set state, after Step #4 and Step #6, this flow is ended (END). As a result, the control portion 7 accurately recognizes the manual feed paper sheet size and controls the printing portion 5 to perform printing based on the recognized paper sheet size. Specifically, a toner image is formed within a range of the recognized size, and not in such a manner as to extend outside the range of the recognized size.

(Automatic Changing of Manual Feed Paper Sheet Size in Case where Placed Document has Run Out)

Figure 7:
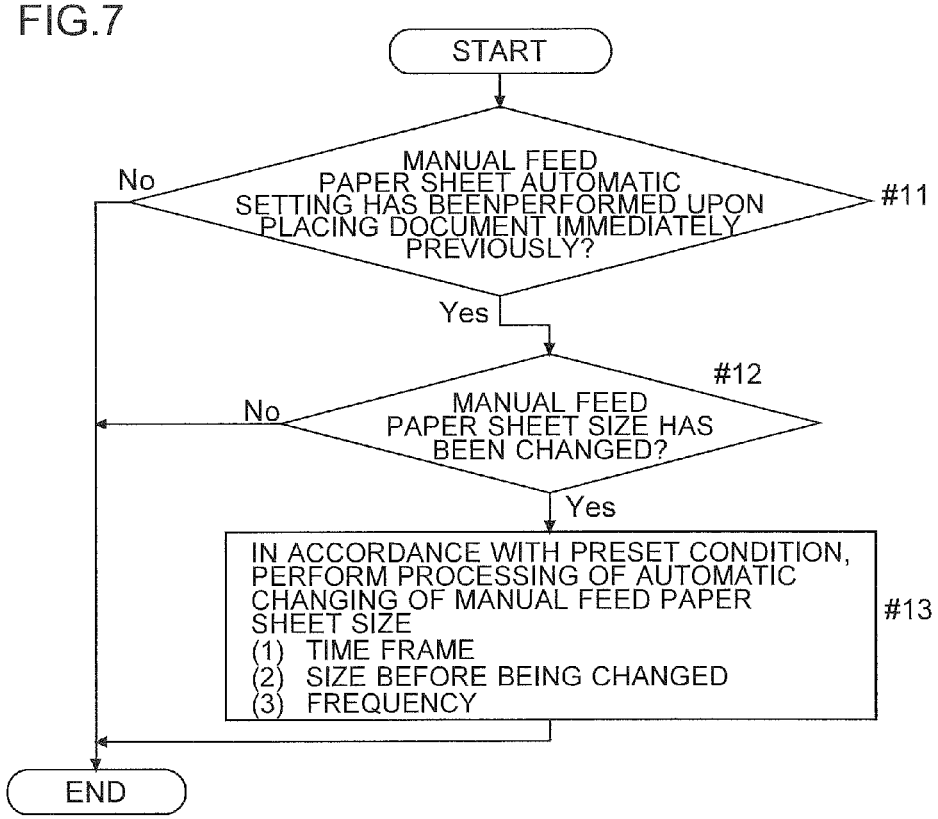
FIG. 7 is a flow chart showing one example of a flow of automatic changing of a manual feed paper sheet size in a case where a placed document has run out.
Figure 8:
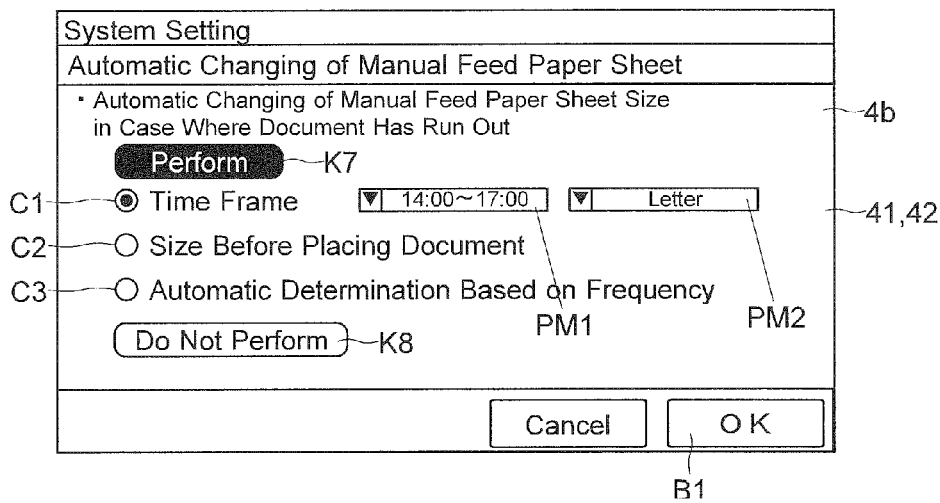
FIG. 8 is a diagram showing one example of an automatic changing setting screen related to the automatic changing of a manual feed paper sheet size in the case where a placed document has run out.

Next, with reference to FIG. 7 and FIG. 8, a description is given of automatic setting of a manual feed paper sheet size in a case where a placed document has run out.

Upon completion of a copy job, the reading unit 1 is in a state where there is no placed document therein. Specifically, when documents are placed in the document conveyance portion 2 and then a copy job of copying them is executed, eventually, all the documents are fed out, bringing about a state where there is no documents on the document tray 21. Furthermore, a user who has placed a document on the stationary reading contact glass 32 normally (unless the user forgets) collects the document after a copy job. As a result, the document on the stationary reading contact glass 32 runs out.

Furthermore, a user with the intention of performing copying, after placing a document in the reading unit 1, may end up not executing the copying and leave the multi-functional peripheral 100, as in a case where the user remembers any other task to do or gets a phone call. In this case, the user would collects the document that has once been placed.

As described above, when a document is placed and copying of the document is completed or when a user leaves the multi-functional peripheral 100 without executing copying, the document is collected. As a result, a state is established in which there is no placed document.

In the multi-functional peripheral 100 (the image forming apparatus), a sensor for detecting a manual feed paper sheet size is not provided in the manual feed tray 61 (the manual paper feed portion 6). Except in a case where manual feed paper sheet automatic setting is performed, at the time of performing printing through paper feeding from the manual paper feed portion 6, it is requested to set a paper sheet size. In a case of a copy job, a manual feed paper sheet size is inputted on the operation panel 4. Furthermore, in a case of a printing job (printing based on printing data transmitted from the computer 200) and a case where printing is performed through paper feeding from the manual feed tray 61, a manual feed paper sheet size is set by using printer driver software of the computer 200.

Here, upon completion of a printing job, basically, there occurs no phenomenon that setting of a manual feed paper sheet size is reset or that a size of a manual feed tray is reset to a default value. Until a manual feed paper sheet size is newly set, the control portion 7 maintains recognition that a paper sheet of a previously set size is placed on the manual feed tray 61 (in the manual paper feed portion 6).

Further, in some cases, it is inconvenient that a user always sets a manual feed paper sheet size. For example, it is assumed that while one user is performing copying or a printing job under setting of a custom size, as an interruption, another copy job under setting of a regular size is performed. When there is a difference in paper sheet size between both of the copy jobs, changing of a manual feed paper sheet size is performed. In this case, a configuration in which, after completion of the copy job as the interruption, setting of a manual feed paper sheet size is automatically reset to the custom size would be extremely convenient for the user who continuously performs the printing using a manual feed paper sheet of the custom size.

In view of the above-described user's convenience, when, after a manual feed paper sheet size had been changed by manual feed paper sheet automatic setting, a placed document has run out, the control portion 7 automatically resets a manual feed paper sheet size that has been recognized (a recognized size) to the size before being changed.

With reference to FIG. 7, the following describes a flow of automatic changing of a manual feed paper sheet size that is performed when a placed document has run out. START in FIG. 7 refers to a point in time when a placed document runs out. This refers to a point in time when, based on an output of the document placement sensor S1, the control portion 7 recognizes that a placed document has run out or a point in time when a document size cannot be recognized by pre-scanning that is performed when the document conveyance portion 2 is opened/closed, based on which the control portion 7 recognizes that a document placed on the stationary reading contact glass 32 has run out.

First, the control portion 7 confirms whether or not, resulting from a document being placed immediately previously, manual feed paper sheet automatic setting has been performed (Step #11). As mentioned above, when a document is placed, in some cases, manual feed paper sheet automatic setting is performed, and in other cases, a user sets a manual feed paper sheet size.

When manual feed paper sheet automatic setting has not been performed (No at #11), this flow (this control) is ended (END). On the other hand, when manual feed paper sheet automatic setting has been performed (Yes at Step #11), it is confirmed whether or not, in the manual feed paper sheet automatic setting, a manual feed paper sheet size has been changed (Step #12).

When, in the manual feed paper sheet automatic setting, a manual feed paper sheet size has not been changed (No at Step #12, when manual feed paper sheets of the same size have been used for a plurality of jobs), it is conceivable that paper sheets of a size currently recognized as a manual feed paper sheet size are continuously used. There is, therefore, no need to change the size. For this reason, when, in manual feed paper sheet automatic setting previously performed, a manual feed paper sheet size has not been changed (No at Step #12), this flow (this control) is ended (END).

On the other hand, when, in manual feed paper sheet automatic setting previously performed, a manual feed paper sheet size has been changed (Yes at Step #12), in accordance with a preset condition, the control portion 7 performs processing of automatically changing a manual feed paper sheet size (Step #13).

Specifically, based on setting performed on an automatic changing setting screen 4b shown in FIG. 8, the control portion 7 performs processing of automatically changing a manual feed paper sheet size. When, as a result thereof, the condition is satisfied, the control portion 7 changes a recognized manual feed paper sheet size.

The automatic changing setting screen 4b in FIG. 8 is one type of system setting screen on which setting of a behavior of the multi-functional peripheral 100 is performed. When a prescribed operation is performed on the operation panel 4, the control portion 7 controls the display portion 41 to display the automatic changing setting screen 4b.

On the automatic changing setting screen 4b, an automatic changing execution key K7 and an automatic changing non-execution key K8 are disposed. It is possible, by touching a display position of the automatic changing execution key K7, to perform setting for using automatic changing of a manual feed paper sheet size when a placed document has run out. On the other hand, it is also possible, by operating the automatic changing non-execution key K8, to perform setting for not performing automatic changing of a manual feed paper sheet size when a placed document has run out. The automatic changing non-execution key K8 is effective for a user when a size of a paper sheet to be placed on the manual feed tray 61 is fixed at all times.

Further, there are provided three radio buttons for setting, in using a function of automatically changing a manual feed paper sheet size when a placed document has run out, a type of case in which the automatic changing is performed and a type of paper sheet to which the automatic changing is performed (a first radio button C1, a second radio button C2, and a third radio button C3). By touching any of the radio buttons, a selection can be made among them.

The first radio button C1 is operated when automatic changing is performed based on a time frame in which a document has run out. Specifically, in a case where the first radio button C1 has been selected and set, when a state is established in which, after a recognized manual feed paper sheet size has been changed to a different size by manual feed paper sheet automatic setting, based on an output of the document placement detection portion, the control portion 7 recognizes that a placed document has run out, and when a current time of day falls within a preset time frame, the control portion 7 recognizes a preset regular size as a manual feed paper sheet size (automatic changing of a recognized size).

Specifically, by operating, among two pull-down menus, a first pull-down menu PM1 on a left side, a preset time frame can be set. Upon the first pull-down menu PM1 being operated, a time frame setting screen, which is not shown, is displayed, and a user can set a desired time frame. Furthermore, by operating a second pull-down menu PM2 on a right side, a type of regular size can be designated. Upon the second pull-down menu PM2 being operated, a regular size setting screen, which is not shown, is displayed, and a user can determine a desired paper sheet size. In a case where, in a company's business operations, a paper sheet size to be used in printing is substantially fixed in a particular time frame, it is particularly effective to change a recognized size based on a time frame and a type of a regular size.

The second radio button C2 is operated when there is performed setting for performing resetting to a recognized size before being changed by manual feed paper sheet automatic setting. In a state where the second radio button C2 is selected and set, when, after recognizing that a size of a paper sheet on the manual feed tray 61 has been changed to a different size by manual feed paper sheet automatic setting, based on an output of the document placement detection portion, the control portion 7 has recognized that a placed document has run out, the control portion 7 recognizes the size before being changed as a size of a paper sheet on the manual feed tray 61 (a recognized size is automatically changed to a size before being changed). This provides convenience in that, in a case where a paper sheet of a custom size is placed on the manual feed tray 61 and is often used, a user is saved the trouble of setting the custom size again.

The third radio button C3 in a bottom tier is operated when it is desired to increase a probability that a manual feed paper sheet size recognized by automatic changing is appropriate. In a case where the third radio button C3 has been selected and set, and after recognizing that a size of a paper sheet on the manual feed tray 61 has been changed to a different size by manual feed paper sheet automatic setting, the control portion 7 has recognized that a placed document has run out, only when the number of times a printing job has been performed within a prescribed time period by using a paper sheet of the size before being changed is not less than a prescribed value, the control portion 7 recognizes that the size before being changed as a size of a paper sheet on the manual feed tray 61. That is, only when a frequency of use of a paper sheet size before being changed is high, a recognized size is automatically changed to the original paper sheet size.

To that end, with respect to each paper sheet size, the storage portion 73 stores the number of times the each paper sheet size has been used in printing within a prescribed time period. The prescribed time period can be determined as appropriate, and as the prescribed time period, several hours, ten and several hours, several tens of hours, a day, several days, a week, a month, or the like can be determined as appropriate. Furthermore, the prescribed value also is set as appropriate correspondingly to the prescribed time period.

Furthermore, a configuration may be adopted in which, when, after recognizing that a size of a paper sheet on the manual feed tray 61 has been changed to a different size by manual feed paper sheet automatic setting, based on an output of the document placement detection portion, the control portion 7 has recognized that a placed document has run out, the control portion 7 recognizes, as a manual feed paper sheet size, a size that has been used in a printing job the highest number of times within a prescribed time period.

(Paper Sheet Size Error)

Figure 9:
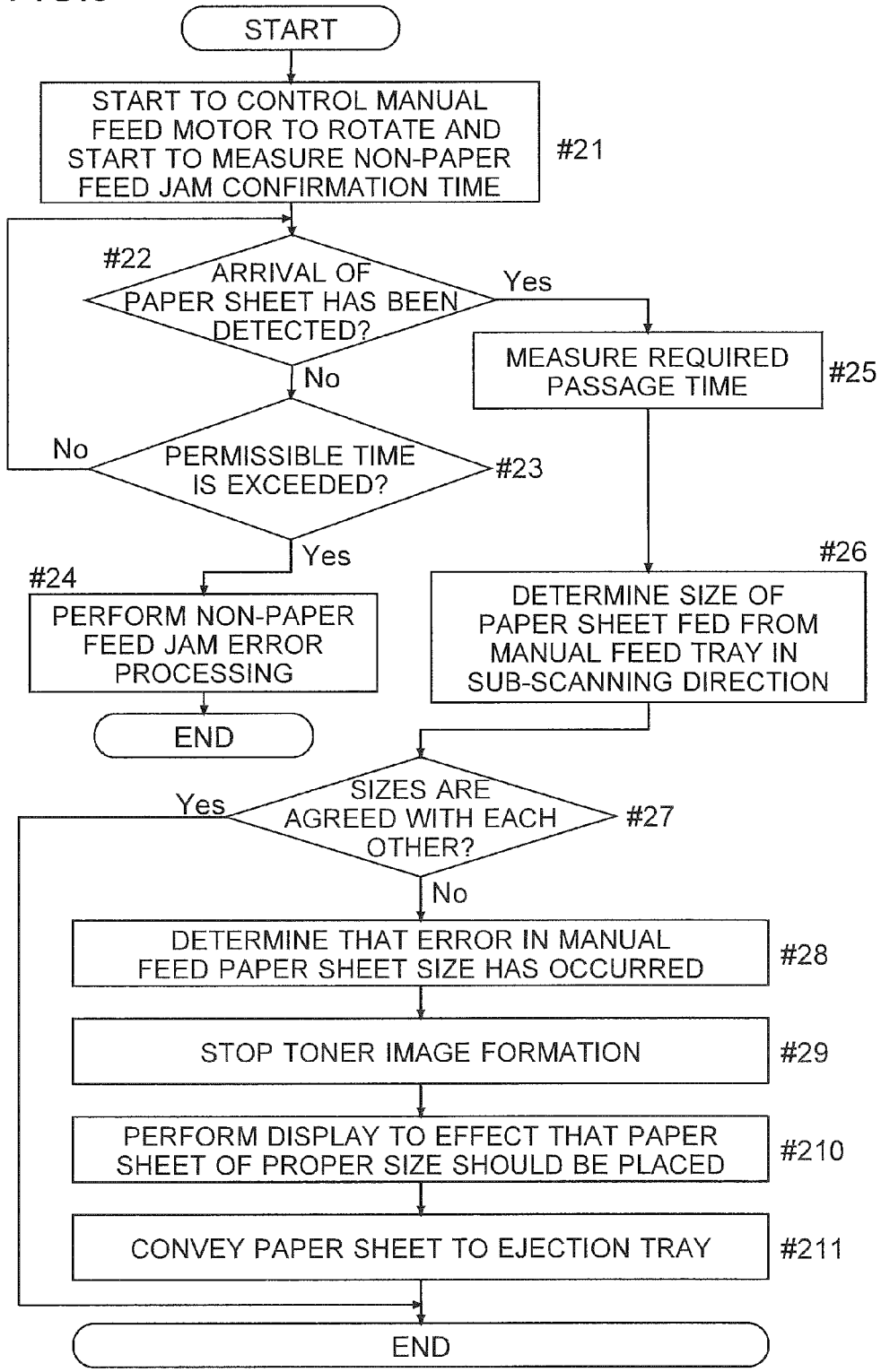
FIG. 9 is a flow chart showing one example of a flow of performing printing through paper feeding from a manual feed tray in the multi-functional peripheral.

Next, with reference to FIG. 1 and FIG. 9, a description is given of an error in size of a paper sheet fed from the manual feed tray 61 in the multi-functional peripheral 100 according to this embodiment. FIG. 9 is a flow chart showing one example of a flow of performing printing through paper feeding from the manual feed tray 61 in the multi-functional peripheral 100.

First, the printing portion 5 in the multi-functional peripheral 100 according to the embodiment shown in FIG. 1 includes the conveyance portion 5b that conveys a fed paper sheet and the image forming portion 5c that forms a toner image and transfers the toner image on a paper sheet. Further, on the conveyance portion 5b (a conveyance path) extending from the manual paper feed portion 6 to the image forming portion 5c, there is provided a conveyance sensor 53 that detects a paper sheet being conveyed thereto.

The conveyance sensor 53 is provided between the manual paper feed portion 6 and a transfer roller 52 that transfers a toner image on a paper sheet. An output value (a level) of the conveyance sensor 53 varies depending on whether or not a paper sheet is present in a detection region thereof. The conveyance sensor 53 is a transmission-type optical sensor including an actuator whose status varies between a light-transmitting state and a light-blocking state depending on whether a paper sheet has reached there and is passing thereby or no paper sheet is present. Furthermore, as the conveyance sensor 53, a reflection-type optical sensor or an ultrasound sensor may be used.

An output of the conveyance sensor 53 is inputted to the control portion 7 (see FIG. 3). Based on the output of the conveyance sensor 53, the control portion 7 recognizes whether or not a paper sheet is present at a detection position of the conveyance sensor 53. Furthermore, based on a fact that the conveyance sensor 53 has detected a paper sheet, the control portion 7 recognizes arrival of the paper sheet at an installation position of the conveyance sensor 53. Furthermore, based on a fact that, after detecting the arrival of the paper sheet, the conveyance sensor 53 has no longer detected a paper sheet, the control portion 7 recognizes passage of the paper sheet from the installation position of the conveyance sensor 53.

Here, a conveyance speed of a paper sheet is preset as a specification value. Accordingly, by multiplying a length of time from a time when the conveyance sensor 53 detects arrival of a paper sheet to a time when the conveyance sensor 53 detects passage of the paper sheet by a specification conveyance speed or a preset conveyance speed, the control portion 7 can determine a size of the paper sheet in the sub-scanning direction.

First, START in FIG. 9 refers to a point in time when printing such as a copy job through paper feeding from the manual feed tray 61 is started.

The control portion 7 starts to control the manual paper feed motor 64 to rotate and starts to measure a non-paper feed jam confirmation time for detecting a non-paper feed jam (Step #21). Then, the control portion 7 confirms whether or not the conveyance sensor 53 has detected arrival of a paper sheet (Step #22). In a case where the arrival of a paper sheet has not been detected (No at Step #22), the control portion 7 confirms whether or not the non-paper feed jam confirmation time exceeds a permissible time that is permitted to elapse before it is determined that a non-paper feed jam has occurred (Step #23).

When the permissible time is not exceeded (No at Step #23), the flow returns to Step #22. When the permissible time is exceeded (Yes at Step #23), the control portion 7 judges that a non-paper feed jam has occurred and performs preset non-paper feed jam error processing (Step #24→END). As the non-paper feed jam error processing, the control portion 7 performs display at the display portion 41 to the effect that the non-paper feed jam has occurred and stops the printing portion 5 from performing paper feeding, paper sheet conveyance, and image formation.

On the other hand, in a case where the arrival of a paper sheet has been detected (Step #22), the control portion 7 measures a required passage time from a time of detecting the arrival of the paper sheet to a time of detecting passage of the paper sheet (Step #25). Then, the control portion 7 multiplies the required passage time by a preset coefficient (the specification conveyance speed) to determine a size of the paper sheet fed from the manual feed tray 61 in the sub-scanning direction (Step #26).

Then, the control portion 7 confirms whether or not the thus determined size in the sub-scanning direction agrees with a length of a recognized manual feed paper sheet size in the sub-scanning direction (whether or not a difference therebetween falls within a permissible range) (Step #27). When the size agrees therewith (Yes at Step #27), there is no problem, and thus the flow is ended.

When the size does not agree therewith (No at Step #27), the control portion 7 determines that there has occurred an error in manual feed paper sheet size (Step #28). Then, the control portion 7 controls the image forming portion 5c to stop toner image formation (Step #29). Furthermore, the control portion 7 controls the display portion 41 to perform display to the effect that a paper sheet of a proper size should be placed (Step #210). Moreover, in order to save the time and trouble of removing the paper sheet from the conveyance path, the control portion 7 controls the conveyance portion 5b to convey the paper sheet remaining in the conveyance path to the ejection tray 51 (Step #211). Then, this flow is ended (END).

(Warning Issued when Magnification Other than Equal Magnification is Set)

Figures 10, 11:
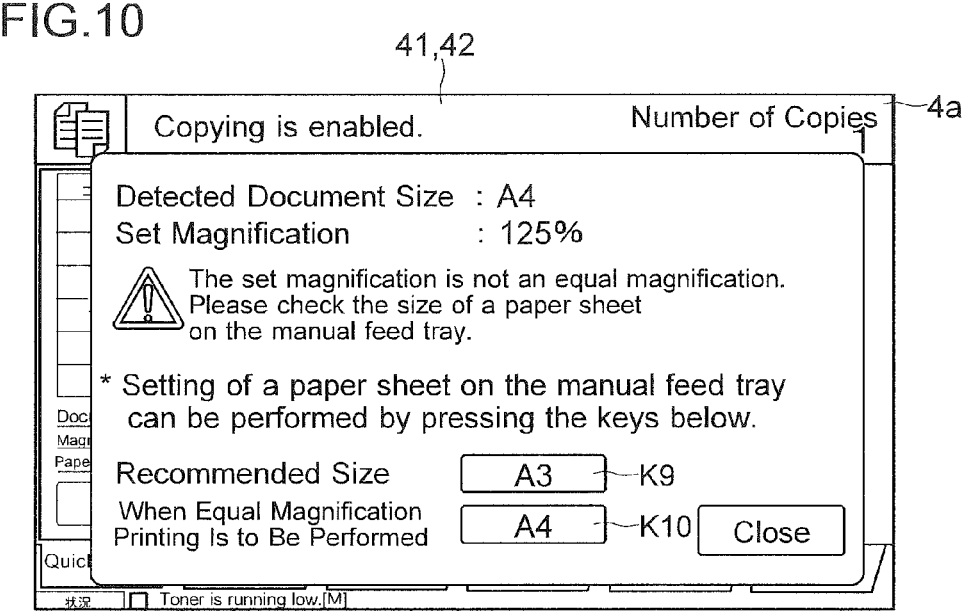
FIG. 10 shows one example of a warning message issued when a magnification other than an equal magnification is set.
FIG. 11 shows one example of data for determining a recommended paper sheet size in accordance with a set magnification.

Next, with reference to FIG. 10 and FIG. 11, a description is given of processing that is performed when a document is placed in the reading unit 1, setting for performing paper feeding from the manual paper feed portion 6 is performed, and a magnification other than an equal magnification is set.

By performing manual feed paper sheet automatic setting, the control portion 7 recognizes, as a manual feed paper sheet size, the same size as a size of a document placed in the reading unit 1. Thus, it is no longer necessary that a user always set a manual feed paper sheet size.

When, however, a magnification other than an equal magnification is set, a condition requiring that an equal magnification be set, which is essential to the prescribed combination, is not satisfied. Because of this, in a state where a magnification other than an equal magnification is set, manual feed paper sheet automatic setting is not performed. In this case, a user is required to perform, by himself/herself, setting of a manual feed paper sheet size on the operation panel 4. Attention is required particularly when a magnification larger than an equal magnification is set. Unless a paper sheet larger than a placed document is placed on the manual feed tray 61, not all of a content of the document may not be printed within printed matter. As a solution to this, when a document is placed in the reading unit 1, setting for performing paper feeding from the manual paper feed portion 6 is performed, and a magnification other than an equal magnification is set, control is performed so that the display portion 41 displays a warning message. Also intended thereby is to simplify setting of a manual feed paper sheet size. In this regard, a description is given below with reference to FIG. 10.

FIG. 10 shows one example of a screen that is displayed on the display portion 41 at a point in time when, after setting of a magnification set value (a magnification other than an equal magnification) is ended, switching to the copy initial screen 4a is performed. Further, on the copy initial screen 4a, the warning message is displayed. As shown in FIG. 10, the warning message is displayed in a pop-up window over the copy initial screen 4a.

The control portion 7 controls the display portion 41 to display a current magnification set by a user (125% in the example in FIG. 10) and a detected size of a placed document. Further, in the example shown in FIG. 10, the set magnification exceeds an equal magnification (100%). When the manual paper feed portion 6 is set as a paper feed source and a magnification other than an equal magnification is set, the control portion 7 controls the display portion 41 to display the warning message that attention should be directed to a manual feed paper sheet size.

In a case where a size of a document is A4 and a magnification is set to 125%, when an A4 paper sheet is placed on the manual feed tray 61 and printing is performed, a part of a content of the document is printed in such a manner as to extend outside the paper sheet. Furthermore, on a photosensitive drum, there is formed a toner image having a length in the main scanning direction not less than a range of a width of the A4 paper sheet. Since, however, the warning message is issued, it is possible to draw a user's attention so that printing of a content of a document is prevented from being performed in such a manner as to extend outside a paper sheet.

Moreover, when a set magnification is not an equal magnification (when an equal magnification is exceeded thereby), the control portion 7 determines a manual feed paper sheet size recommended in performing printing at the set magnification, and controls the display portion 41 to display the warning message and the recommended manual feed paper sheet size thus determined (a regular size).

The storage portion 73 stores data for determining the recommended manual feed paper sheet size (see FIG. 11). Types of recommended manual feed paper sheet sizes to be determined in accordance with a magnification (a content of data) can be determined as appropriate. Specifically, with respect to each regular size, a recommended regular size for a manual feed paper sheet is determined so that a length obtained by multiplying a longitudinal side of a document by a magnification and a length obtained by multiplying a lateral side of the document by the magnification fall within a range of a longitudinal side of the manual feed paper sheet and a range of a lateral side of the manual feed paper sheet, respectively. Based on such data stored in the storage portion 73 and a set magnification, the control portion 7 determines a recommended manual feed paper sheet size. In the example in FIG. 10, as a recommended manual feed paper sheet size, the display portion displays an A3 size.

Moreover, when the warning message is displayed, the control portion 7 controls the display portion 41 to display a key for selecting a manual feed paper sheet size. In the example in FIG. 10, size selection keys K9 and K10 are displayed. The size selection key K9 is a key for setting a recommended manual feed paper sheet size as a manual feed paper sheet size. The size selection key K10 is a key for setting the same size as that of a placed document as a manual feed paper sheet size. The reason for displaying a key for setting the same size as that of a document as a manual feed paper sheet size (the size selection key K10), is to prevent a magnification other than an equal magnification from being set erroneously.

The size selection key K9 includes a character string indicating a recommended manual feed paper sheet size. Upon the touch panel portion 42 accepting an operation with respect to the size selection key K9, without changing a magnification set value, the control portion 7 recognizes a recommended manual feed paper sheet size as a manual feed paper sheet size. Then, at the time of printing, the control portion 7 controls the image forming portion 5c to form a toner image corresponding to a recommended size of a manual feed paper sheet in the main scanning direction.

On the other hand, the size selection key K10 includes a character string indicating the same size as that of a placed document. Upon the touch panel portion 42 accepting an operation with respect to the size selection key K10, the control portion 7 automatically sets a magnification set value to an equal magnification and recognizes a detected document size as a manual feed paper sheet size. It can be said that this type of processing is one type of manual feed paper sheet automatic setting.

For example, in a case where a document is in A4 size and printing thereof is performed on a B5 paper sheet, when automatic scaling has been set, a resulting magnification has a value of about 84% to 86%. In a case where a size of a placed document is A4 and a paper sheet size smaller by one level than that of the document is B5, unless a magnification is set to not more than 84% to 86%, not all of a content of the A4 document cannot be included in a B5-size paper sheet.

Thus, under conditions described below, the control portion 7 may control the display portion 41 not to display the pop-up window. Or even in a case when the pop-up window is displayed, the control portion 7 may control the display portion 41 to display the size selection keys K9 and K10 so that the same size as that of a placed document is displayed thereon.

(Condition 1) The manual paper feed portion 6 is used.
(Condition 2) A document has been placed (as a result of detection, the control portion 7 has recognized a document size).
(Condition 3) A magnification smaller than an equal magnification has been set.
(Condition 4) The set magnification is not less than a largest possible magnification at which all of a content of a document can be included in a paper sheet of a size smaller by one level than that of the document.

(Setting of Manual Feed Paper Sheet Size from Paper Feed Source Selection Screen 4a1)

Figure 12:
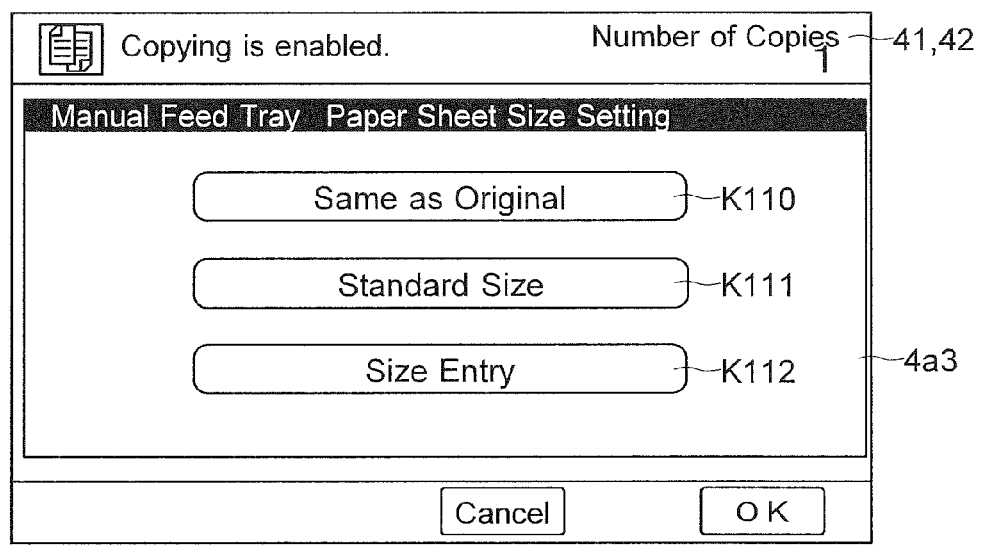
FIG. 12 is a diagram showing one example of a manual feed paper sheet setting screen for setting a size of a paper sheet in a manual paper feed portion (the manual feed tray).

Next, with reference to FIG. 12, a description is given of setting of a manual feed paper sheet size on a manual feed paper sheet setting screen 4a3.

When printing is performed through paper feeding from the manual feed tray 61, it is required that the manual feed tray 61 be set as a paper feed source. On the paper feed source selection screen 4a1, setting for setting the manual feed tray 61 as a paper feed source can be performed (see FIG. 5B).

The manual paper feed portion 6 is not provided with a sensor for detecting a size of a manual feed paper sheet placed therein. A configuration may, therefore, be adopted in which, when the manual paper feed portion 6 (the manual feed tray 61) is selected as a paper feed source, the display portion 41 displays the manual feed paper sheet setting screen 4a3 (see FIG. 12). In other words, when, on the paper feed source selection screen 4a1, the one of the paper feed source selection keys K11 that corresponds to the manual feed tray 61 has been operated, the display portion 41 may automatically display the manual feed paper sheet setting screen 4a3. Thus, without performing a switching operation to a screen for setting a paper sheet size, a size of a paper sheet on the manual feed tray 61 can be immediately set, so that a setting operation can be simplified.

On the manual feed paper sheet setting screen 4a3, three types of keys are provided, which are a document same size key K110, a standard size key K111, and a size input key K112.

The operation panel 4 (the touch panel portion 42) accepts an operation with respect to the document same size key K110 as setting for setting a document size recognized by the control portion 7 as a manual feed paper sheet size. Then, the control portion 7 recognizes the recognized document size as the manual feed paper sheet size. Upon a document size being designated on the document size setting screen 4a2 by a user, the control portion 7 recognizes the document size designated by the user as a manual feed paper sheet size. Furthermore, when automatic detection of a document size has been set, the control portion 7 recognizes a document size detected by using the sensors as a manual feed paper sheet size.

Furthermore, the operation panel 4 accepts an operation with respect to the standard size key K111 as setting for setting a preset standard size as a manual feed paper sheet size. The standard size is set in advance on a system setting screen (not shown) of the operation panel 4. Any regular size can be set as the standard size, and a custom size can be set as the standard size. In this case, the control portion 7 recognizes that a manual feed paper sheet size is the standard size.

Moreover, the operation panel 4 accepts an operation with respect to the size input key K112 as an instruction to set a manual feed paper sheet size by manual input. Upon the size input key K112 being operated, the display portion 41 displays a screen for setting the size by inputting a numerical value on the numeric keypad portion 43b. Thus, a user can set a manual feed paper sheet size by inputting a length. In this case, the control portion 7 recognizes the size thus inputted manually as the manual feed paper sheet size.

In a case where the set value setting the manual paper feed portion 6 as a paper feed source and the set value setting an equal magnification have been set, and the set value designating a size of a placed document is set, or the set value setting a document size to be automatically detected based on an output of the document size detection portion is set, it follows that all the condition set values included in the prescribed combination have been set. Accordingly, a configuration may be adopted in which, when, after setting of an equal magnification and setting related to a size of a placed document have been performed, the set value setting the manual paper feed portion 6 as a paper feed source is set, without displaying the manual feed paper sheet setting screen 4a3, the control portion 7 performs manual feed paper sheet automatic setting.

Furthermore, in accordance with setting for setting the manual paper feed portion 6 as a paper feed source, on the manual feed paper sheet setting screen 4a3, after a manual feed paper sheet size is set, setting of an equal magnification and setting of a document size may be performed. In other words, after a manual feed paper sheet size is set on the manual feed paper sheet setting screen 4a3, all the condition set values included in the prescribed combination may be set.

In such a case, the control portion 7 may perform manual feed paper sheet automatic setting. In a case where a manual feed paper sheet size set on the manual feed paper sheet setting screen 4a3 is different from an automatically detected or designated document size, the control portion 7 may change the recognized manual feed paper sheet size to the automatically detected or designated document size. In a case where, between a point in time when all the condition set values included in the prescribed combination are set and a point in time a prescribed length of time earlier than said point in time, a manual feed paper sheet size has been set on the operation panel 4 (on the manual feed paper sheet setting screen 4a3), the control portion 7 does not perform manual feed paper sheet automatic setting.

In this manner, the operation panel 4 is contrived so that, in a case where the manual paper feed portion 6 (the manual feed tray 61) is selected as a paper feed source, a procedure of setting a manual feed paper sheet size can be simplified.

As discussed above, the image forming apparatus (the multi-functional peripheral 100) according to the embodiment is provided with the reading unit 1 that includes the document placement detection portion (the document placement sensor S1, the table document sensors S5, and the reading mechanism 3a) that detects that a document is placed and the document size detection portion (the size sensors S2, the variable resistor portion S3, the table document sensors S5, and the reading mechanism 3a) that is used to detect a size of the document thus placed, the printing portion 5 that is provided with the manual paper feed portion 6 that supplies a paper sheet to be used for printing by the printing portion 5 and includes the manual feed tray 61, which itself is not provided with a sensor for detecting a size of a paper sheet placed thereon, and based on image data obtained through reading at the reading unit 1 or received data, performs printing, the operation panel 4 that includes the display portion 41 that displays a setting screen for performing setting related to printing and document reading, accepts the setting related to printing and document reading, and accepts setting for performing paper feeding from the manual paper feed portion 6, setting of a size of a manual feed paper sheet that is the paper sheet placed on the manual feed tray 61, and setting of the size of the document placed in the reading unit 1, and the control portion 7 that, based on an output of the document size detection portion, automatically detects a size of a placed document that is the document placed in the reading unit 1, based on the automatic detection of the size of the placed document performed based on an output of the document size detection portion or the setting of the size of the document performed on the operation panel 4, recognizes the size of the placed document, performs manual feed paper sheet automatic setting in which the size of the placed document thus recognized is recognized as the size of the manual feed paper sheet, controls the manual paper feed portion 6 to perform paper feeding, and based on a recognized size that is the size of the paper sheet thus recognized, controls the printing portion 5 to perform printing on a paper sheet fed from the manual paper feed portion 6.

According to this configuration, in a case of a configuration in which the manual feed tray 61 is not provided with a plurality of sensors for detecting a paper sheet size, a size of a manual feed paper sheet (a paper sheet placed on the manual feed tray 61) is automatically set (recognized). This saves a user the trouble of setting a manual feed paper sheet size, thereby preventing the user from feeling botheration and discomfort. Furthermore, it is also possible to place a paper sheet to be used for printing as a document so that the paper sheet is detected as the document, and automatically set a size thereof as a manual feed paper sheet size to be used in the printing. Furthermore, since there is saved the trouble of providing the manual feed tray 61 with a sensor for detecting a paper sheet size, a manufacturing cost of the image forming apparatus (the multi-functional peripheral 100) can be reduced. Furthermore, generally, in duplicating (copying) a document, a magnification is often set to an equal magnification (100%), and thus a user who desires to perform equal-magnification copying often places a paper sheet of the same size as that of the document on the manual feed tray 61, as a result of which the probability is high that an accurate size is recognized as a manual feed paper sheet size.

Furthermore, since a paper sheet size that is the same as a size of a document placed in the reading unit 1 is recognized as a manual feed paper sheet size, a user can easily estimate a size recognized by the control portion 7 as a manual feed paper sheet size. It is, however, also possible for a user to set a manual feed paper sheet size by operating the operation panel 4. For this reason, only when a size of a paper sheet (a manual feed paper sheet) on which a user desires to perform printing is different from a document size, the user is required to input a manual feed paper sheet size on the operation panel 4, and not required to always set a manual feed paper sheet size.

Furthermore, the condition set values that are a plurality of prescribed set values are preset. Furthermore, the prescribed combination of the condition set values is determined. Further, in a state where a document is placed in the reading unit 1, and when all the condition set values included in the prescribed combination have been set (when a last remaining unset one of the condition set values included in the prescribed combination has been set), the control portion 7 performs manual feed paper sheet automatic setting, while in a state where not all the condition set values included in the prescribed combination are set, even when a document is placed in the reading unit 1, the control portion 7 does not perform manual feed paper sheet automatic setting. According to this configuration, a triggering condition (a trigger) for manual feed paper sheet automatic setting is preset, and thus an administrator of the image forming apparatus (the multi-functional peripheral 100) is saved the time and trouble of determining a triggering condition for manual feed paper sheet automatic setting and is not required to perform an operation of managing the triggering condition. Accordingly, even without providing a sensor for detecting a manual feed paper sheet size, a burden on an administrator of the image forming apparatus is prevented from being increased.

Furthermore, in a case where, between a point in time when all the condition set values included in the prescribed combination are set and a point in time a prescribed length of time earlier than that point in time, a manual feed paper sheet size has been set by an input on the operation panel 4, the control portion 7 does not perform manual feed paper sheet automatic setting and recognizes the size set on the operation panel 4 as a manual feed paper sheet size. According to this configuration, a size set on the operation panel 4 by a user is recognized as a manual feed paper sheet size on a priority basis.

Furthermore, the printing portion 5 includes, in addition to the manual paper feed portion 6, the paper feed portion 5*a*. Further, the operation panel 4 accepts setting for selecting one of a plurality of paper feed sources, setting of a magnification to be used in printing (a ratio of printed matter to a document where a size of the document is assumed to be 1, a ratio of a content of the document, which is to be printed on printed matter, where the size of the document is assumed to be 1), and setting of a document size. The condition set values are the set value setting the manual paper feed portion 6 as a paper feed source, the set value setting an equal magnification as a magnification to be used in printing, the set value setting a document size to be automatically detected based on an output of the document size detection portion (the document placement sensor S1, the table document sensors S5, and the reading mechanism 3*a*), and the set value designating a size of a placed document. Further, when the set value setting the manual paper feed portion 6 as a paper feed source, the set value setting an equal magnification, and the set value setting a document size to be automatically detected based on an output of the document size detection portion are set, the control portion 7 performs manual feed paper sheet automatic setting in which an automatically detected size of a placed document is recognized as a manual feed paper sheet size. Furthermore, when the set value setting the manual paper feed portion 6 as a paper feed source, the set value setting an equal magnification, and the set value designating a size of a placed document are set, the control portion 7 performs manual feed paper sheet automatic setting in which a designated size of a placed document is recognized as a manual feed paper sheet size. According to this configuration, when printing is performed through paper feeding from the manual feed tray 61, as the condition set values, there are used set values that are highly frequently set, are set values of setting items that should be confirmed at the time of executing a job, and are set values that are set when equal magnification printing is performed, and thus only when a document size and a manual feed paper sheet size should be the same, an automatic recognition function of recognizing a manual feed paper sheet size by manual feed paper sheet automatic setting can be exerted.

Furthermore, when the control portion 7 has performed manual feed paper sheet automatic setting, the operation panel 4 does not accept setting for changing any of the condition set values. According to this configuration, a set value can be restricted from being changed in such a way that, after manual feed paper sheet automatic setting, printing through paper feeding from the manual feed tray 61 is no longer performed in an appropriate manner. In other words, after manual feed paper sheet automatic setting has been performed, setting of a set value in a prohibition relationship therewith, such as in a case of changing a magnification, can be inhibited.

Furthermore, when, after manual feed paper sheet automatic setting had been performed, the operation panel 4 has accepted setting for changing any of the condition set values, the control portion 7 abandons a recognition result of a paper sheet size obtained by the manual feed paper sheet automatic setting.

According to this configuration, at a point in time when, although a manual feed paper sheet size has once been recognized by manual feed paper sheet automatic setting, as a result of a set value being changed, an appropriate paper sheet size to be used in printing no longer agrees with the recognized size, the recognized size obtained by the manual feed paper sheet automatic setting is automatically cancelled. Thus, without the need for a user to perform any operation, recognition of a manual feed paper sheet size is automatically cancelled.

Furthermore, upon the abandonment, the control portion 7 controls the display portion 41 to display the setting screen for setting a manual feed paper sheet size. According to this configuration, when setting in a prohibition relationship with current setting is newly performed, bringing about a state where it is required to set a paper sheet size again, it is possible to ensure that a user always performs size designation required in performing appropriate printing.

Based on data received from the computer, the image forming apparatus (the multi-functional peripheral 100) performs printing (the printer function). Further, as in a case of collectively printing papers such as a diary, reports, bills, and invoices, there may be a time frame in which printing is performed by using only paper sheets of the same size. In view of this, in a state where, after recognizing that a size of a paper sheet on the manual feed tray 61 has been changed to a different size by manual feed paper sheet automatic setting, based on an output of the document placement detection portion (the document placement sensor S1, the table document sensors S5, and the reading mechanism 3a), the control portion 7 recognizes that a placed document has run out, and when a current time of day falls within a preset time frame, the control portion 7 recognizes a preset regular size as a manual feed paper sheet size.

According to this configuration, when, after the control portion 7 has recognized that a paper sheet size often used in a particular time frame has been changed to the same size as that of a placed document by manual feed paper sheet automatic setting resulting from the document being placed, the placed document has run out as a result of completing a job or discontinuing the job, the control portion 7 automatically resets the recognized size (a size recognized by the control portion 7 as a manual feed paper sheet size) to the original size (a size before being changed). For example, even when a copy job is performed as an interruption between printer printing jobs based on data transmission from a user's computer, upon the copying being ended, a recognized size is automatically reset to an original size. Thus, a printer printing job can be restarted swiftly.

Furthermore, when, after recognizing that a manual feed paper sheet size has been changed to a different size by manual feed paper sheet automatic setting, based on an output of the document placement detection portion (the document placement sensor S1, the table document sensors S5, and the reading mechanism 3a), the control portion 7 has recognized that a placed document has run out, the control portion 7 recognizes the size before being changed as a manual feed paper sheet size.

According to this configuration, even in a case where a manual feed paper sheet size recognized by the control portion 7 has been changed by manual feed paper sheet automatic setting resulting from a copy job, when it is acknowledged that a placed document has run out, based on which a copy job has been ended or discontinued, the control portion 7 automatically resets a recognized size to the original size (a size before being changed). Thus, even when another person's copy job is performed as an interruption between printing jobs for which a custom size or the like is set by a user and the image forming apparatus (the multi-functional peripheral 100) is used as a printer, without the need for the user to bother to set a manual feed paper sheet size again on the operation panel 4, a recognized size is automatically reset to an original size. Thus, a printer printing job can be restarted swiftly.

Furthermore, the multi-functional peripheral 100 includes the storage portion 73 that stores, with respect to each paper sheet size, the number of times the each paper sheet size has been set as a manual feed paper sheet size and used in printing within a prescribed time period. When, after recognizing that a manual feed paper sheet size has been changed to a different size by manual feed paper sheet automatic setting, based on an output of the document placement detection portion (the document placement sensor S1, the table document sensors S5, and the reading mechanism 3a), the control portion 7 has recognized that a placed document has run out, in a case where the number of times a printing job has been performed by using a paper sheet of the size before being changed is not less than a prescribed value, the control potion 7 recognizes the size before being changed as a manual feed paper sheet size.

According to this configuration, when a recognized size has been changed by manual feed paper sheet automatic setting resulting from a copy job, only in a case where a paper sheet of a size before being changed is often used, upon acknowledgment that a copy job has been ended or discontinued, the recognized size is automatically reset to the size before being changed. Thus, only when it is highly required that a recognized size be reset to a size before being changed, the recognized size can be reset to the size before being changed.

Furthermore, the printing portion 5 includes the conveyance portion 5b that conveys a fed paper sheet, the image forming portion 5c that forms a toner image and transfers the toner image on a paper sheet conveyed thereto, and the conveyance sensor 53 that is installed in the conveyance portion 5b and detects a paper sheet conveyed thereto. Further, in a case where paper feeding is performed from the manual paper feed portion 6, the control portion 7 determines a size in the sub-scanning direction of a paper sheet to be used for printing by multiplying a length of time from a time when the conveyance sensor 53 detects arrival of the paper sheet to a time when the conveyance sensor 53 detects passage of the paper sheet by a preset conveyance speed. When the thus determined size in the sub-scanning direction is different from a recognized manual feed paper sheet size, the control portion 7 performs control so that the image forming portion 5c stops toner image formation, the display portion 41 performs display to the effect that a paper sheet of a proper size should be placed, and the conveyance portion 5b conveys the paper sheet to the ejection tray 51.

According to this configuration, when an appropriate manual feed paper sheet size is not recognized, a warning can be issued by performing error display. Furthermore, since toner image formation, which would otherwise be useless, is stopped, useless toner consumption can be prevented. Furthermore, since conveyance of a paper sheet that has once been fed is not stopped, and the paper sheet is then directly ejected onto the ejection tray 51, there is also no need for an operation in which, by opening the cover of the image forming apparatus (the multi-functional peripheral 100), the paper sheet is removed from inside the image forming apparatus.

Furthermore, the operation panel 4 accepts setting of a magnification to be used in printing, and when a size of a document placed in the reading unit 1 is detected, the magnification thus set is not a magnification other than an equal magnification, and setting for performing paper feeding from the manual paper feed portion 6 has been performed, the control portion 7 controls the display portion 41 to display a warning message that attention should be directed to a manual feed paper sheet size. According to this configuration, in a case where a paper sheet of a size different from that of a document should be placed on the manual feed tray 61, it is possible to draw a user's attention.

Furthermore, when a set magnification is not an equal magnification, the control portion 7 determines a manual feed paper sheet size recommended in performing printing at the set magnification, and controls the display portion 41 to display the warning message and the recommended manual feed paper sheet size thus determined. According to this configuration, it is possible to inform a user of a size that corresponds to a set magnification and is a smallest possible paper sheet size (a regular size) that allows a content of a document to be printed so as not to extend outside thereof. Further, a paper sheet of an appropriate size (an appropriate regular-size paper sheet) can be set on the manual feed tray 61.

Furthermore, when the warning message is displayed, the control portion 7 controls the display portion 41 to display the keys (the size selection keys K9 and K10) for selecting a manual feed paper sheet size, and when a size selected as the manual feed paper sheet size by an operation with respect to one of the keys is the same as a detected document size, a magnification set value is automatically set to an equal magnification. According to this configuration, printing on a paper sheet fed from the manual feed tray 61 is prevented from being performed at an erroneous magnification.

The display portion 41 displays the paper feed source selection screen 4a1 (see FIG. 5A) for setting a paper feed source, and when setting for selecting the manual feed tray 61 as a paper feed source has been performed on the paper feed source selection screen 4a1, automatically displays the manual feed paper sheet setting screen 4a3 (see FIG. 12) including the document same size key K110 for setting a document size recognized by the control portion 7 as a manual feed paper sheet size. When the operation panel 4 has accepted an operation with respect to the document same size key K110, the control portion 7 recognizes a document size detected based on an output of the document size detection portion (the document placement sensor S1, the table document sensors S5, and the reading mechanism 3a) or a document size designated by a user as a manual feed paper sheet size. According to this configuration, a manual feed paper sheet size can be easily set in accordance with setting of a paper feed source.

While the foregoing has described the embodiment of the present invention, the scope of the present invention is not limited thereto, and the present invention can be implemented by adding various modifications thereto without departing from the spirit of the invention.

INDUSTRIAL APPLICABILITY

The present invention is applicable to a reading device and an image forming apparatus provided with the same.

The invention claimed is:

1. An image forming apparatus, comprising:
    a reading unit that includes a document placement detection portion that detects that a document is placed and a document size detection portion that is used to detect a size of the document thus placed;
    a printing portion that is provided with a manual paper feed portion that supplies a paper sheet to be used for printing and includes a manual feed tray, which itself is not provided with a sensor for detecting a size of a paper sheet placed thereon, and based on image data obtained through reading at the reading unit or received data, performs printing;
    an operation panel that includes a display portion that displays a setting screen for performing setting related to printing and document reading, accepts the setting related to printing and document reading, and accepts setting for performing paper feeding from the manual paper feed portion, setting of a size of a manual feed paper sheet that is the paper sheet placed on the manual feed tray, and setting of a size of the document placed in the reading unit; and
    a control portion that, based on automatic detection of a size of a placed document that is the document placed in the reading unit, which is performed based on an output of the document size detection portion, or the setting of a size of the placed document performed on the operation panel, recognizes a size of the placed document, performs manual feed paper sheet automatic setting in which the size of the placed document thus recognized is recognized as a size of the manual feed paper sheet, controls the manual paper feed portion to perform paper feeding, and based on a recognized size that is the size of the paper sheet thus recognized, controls the printing portion to perform printing on a paper sheet fed from the manual paper feed portion, wherein
    in a case where, after recognizing that a size of the paper sheet on the manual feed tray has been changed to a different size by the manual feed paper sheet automatic setting, based on an output of the document placement detection portion, the control portion recognizes that the document placed has run out, the control portion recognizes a regular size preset with respect to a time frame within which a current time of day falls as a size of the manual feed paper sheet or recognizes the size before being changed as a size of the manual feed paper sheet.

2. The image forming apparatus according to claim 1, wherein
    condition set values that are a plurality of set values are preset,
    a prescribed combination of the condition set values is determined, and
    in a state where a document is placed in the reading unit, and when all the condition set values included in the prescribed combination have been set, the control portion performs the manual feed paper sheet automatic setting, while in a state where not all the condition set values included in the prescribed combination are set, even when a document is placed in the reading unit, the control portion does not perform the manual feed paper sheet automatic setting.

3. The image forming apparatus according to claim 2, wherein
    in a case where, between a point in time when all the condition set values included in the prescribed combination are set and a point in time a prescribed length of time earlier than that point in time, a size of the manual feed paper sheet has been set by an input on the operation panel, the control portion does not perform the manual feed paper sheet automatic setting and recognizes the size set on the operation panel as a size of the manual feed paper sheet.

4. The image forming apparatus according to claim 2, wherein
    the printing portion includes, in addition to the manual paper feed portion, a paper feed portion,
    the operation panel accepts setting for selecting one of a plurality of paper feed sources, setting of a magnification to be used in printing, and setting of a document size,
    the condition set values are a set value setting the manual paper feed portion as a paper feed source, a set value setting an equal magnification as a magnification to be used in printing, a set value setting the document size to be automatically detected based on an output of the document size detection portion, and a set value designating a size of the placed document,
    when the set value setting the manual paper feed portion as a paper feed source, the set value setting an equal magnification, and the set value setting the document size to be automatically detected based on an output of the document size detection portion are set, the control portion performs, as the manual feed paper sheet automatic setting, setting in which an automatically detected size of the placed document is recognized as a size of the manual feed paper sheet, and when the set value setting the manual paper feed portion as a paper feed source, the set value setting an equal magnification, and the set value designating a size of the placed document are set, the control portion performs, as the manual feed paper sheet automatic setting, setting in which a designated size of the placed document is recognized as a size of the manual feed paper sheet.

5. The image forming apparatus according to claim 1, wherein the display portion displays a paper feed source selection screen for setting a paper feed source, and when setting for selecting the manual feed tray as a paper feed source has been performed on the paper feed source selection screen, displays a manual feed paper sheet setting screen including a document same size key for setting a size of a document recognized by the control portion as a size of the manual feed paper sheet, and when the operation panel has accepted an operation with respect to the document same size key, the control portion recognizes a document size detected based on an output of the document size detection portion or a document size designated by a user as a size of the manual feed paper sheet.

6. The image forming apparatus according to claim 2, wherein when the control portion has performed the manual feed paper sheet automatic setting, the operation panel does not accept setting for changing any of the condition set values.

7. The image forming apparatus according to claim 2, wherein when, after the manual feed paper sheet automatic setting had been performed, the operation panel has accepted setting for changing any of the condition set values, the control portion abandons a recognition result of a paper sheet size obtained by the manual feed paper sheet automatic setting, and upon the abandonment, the control portion controls the display portion to display a setting screen for setting a size of the manual feed paper sheet.

8. The image forming apparatus according to claim 1, further comprising:

a storage portion that stores, with respect to each paper sheet size, a number of times the each paper sheet size has been set as a size of the manual feed paper sheet and used in printing within a prescribed time period, wherein when, after recognizing that a size of the manual feed paper sheet has been changed to a different size by the manual feed paper sheet automatic setting, based on an output of the document placement detection portion, the control portion has recognized that a document placed has run out, and in a case where a number of times a printing job has been performed within the prescribed time period by using a paper sheet of the size before being changed is not less than a prescribed value, the control potion recognizes the size before being changed as a size of the manual feed paper sheet.

9. The image forming apparatus according to claim 1, wherein the printing portion comprises:
   a conveyance portion that conveys a fed paper sheet;
   an image forming portion that forms a toner image and transfers the toner image on a paper sheet conveyed thereto; and
   a conveyance sensor that is installed in the conveyance portion and detects a paper sheet conveyed thereto, wherein in a case where paper feeding is performed from the manual paper feed portion, the control portion determines a size in a sub-scanning direction of a paper sheet to be used for printing by multiplying a length of time from a time when the conveyance sensor detects arrival of the paper sheet to a time when the conveyance sensor detects passage of the paper sheet by a preset conveyance speed, and when the thus determined size in the sub-scanning direction is different from a recognized size of the manual feed paper sheet, the control portion performs control so that the image forming portion stops formation of the toner image, the display portion performs display to an effect that a paper sheet of a proper size should be placed, and the conveyance portion conveys the paper sheet to an ejection tray.

10. The image forming apparatus according to claim 2, wherein the operation panel accepts setting of a magnification to be used in printing, and when the magnification thus set is a magnification other than an equal magnification, and the setting for performing paper feeding from the manual paper feed portion has been performed, the control portion controls the display portion to display a warning message that attention should be directed to a size of the manual feed paper sheet.

11. The image forming apparatus according to claim 10, wherein when the magnification thus set is not an equal magnification, the control portion determines a size of the manual feed paper sheet recommended in performing printing at the set magnification, and controls the display portion to display the warning message and the recommended size of the manual feed paper sheet thus determined.

12. The image forming apparatus according to claim 11, wherein when the warning message is displayed, the control portion controls the display portion to display keys for selecting a size of the manual feed paper sheet, and when the size selected as a size of the manual feed paper sheet by an operation with respect to one of the keys is the same as a detected document size, the control portion automatically sets a set value of a magnification to an equal magnification, and recognizes the detected document size as a size of the manual feed paper sheet.

13. A method for controlling an image forming apparatus, comprising steps of:

detecting that a document is placed;

detecting a size of the document thus placed by using a document size detection portion;

supply a paper sheet to be used for printing;

performing printing based on image data obtained through reading or received data;

displaying a setting screen for performing setting related to printing and document reading;

accepting the setting related to printing and document reading;

accepting setting for performing paper feeding from a manual paper feed portion that includes a manual feed tray, which itself is not provided with a sensor for detecting a size of a paper sheet placed thereon, setting of a size of a manual feed paper sheet that is the paper sheet placed on the manual feed tray, and setting of a size of the document placed in the reading unit;

based on automatic detection of a size of a placed document that is the document placed in the reading unit, which is performed based on an output of the document size detection portion, or the setting of a size of the placed document thus accepted, recognizing a size of the placed document, performing manual feed paper sheet automatic setting in which the size of the placed document thus recognized is recognized as a size of the manual feed paper sheet, based on a recognized size that is the size of the paper sheet thus recognized, performing printing on a paper sheet fed from the manual paper feed portion, and in a case where, after it is recognized that a size of the paper sheet on the manual feed tray has been changed to a different size by the manual feed paper sheet automatic setting, it is recognized that the document placed has run out, recognizing a regular size preset with respect to a time frame within which a current time of day falls as a size of the manual feed paper sheet or recognizing the size before being changed as a size of the manual feed paper sheet.

* * * * *